United States Patent
Widdowson et al.

(10) Patent No.: US 7,751,627 B2
(45) Date of Patent: Jul. 6, 2010

(54) IMAGE DOMINANT LINE DETERMINATION AND USE

(75) Inventors: Simon Widdowson, Palo Alto, CA (US); James A. Rowson, Palo Alto, CA (US); Eamonn O'Brien-Strain, Palo Alto, CA (US); Parkesh Reddy, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1010 days.

(21) Appl. No.: 11/496,808

(22) Filed: Jul. 31, 2006

(65) Prior Publication Data
US 2008/0025639 A1    Jan. 31, 2008

(51) Int. Cl.
  G06K 9/62  (2006.01)
  G06K 9/36  (2006.01)
(52) U.S. Cl. .................. 382/215; 382/209; 382/284
(58) Field of Classification Search .............. None
  See application file for complete search history.

(56) References Cited

U.S. PATENT DOCUMENTS

| 6,201,541 | B1 * | 3/2001 | Shalom et al. ............ 345/419 |
| 6,351,494 | B1 * | 2/2002 | Kondo et al. ............ 375/240.27 |
| 6,442,202 | B1 * | 8/2002 | Borer .................... 375/240.16 |
| 6,597,738 | B1 * | 7/2003 | Park et al. ............. 375/240.16 |
| 7,302,111 | B2 * | 11/2007 | Olsson et al. ............. 382/266 |
| 2002/0118287 | A1 | 8/2002 | Grosvenor et al. |
| 2003/0025798 | A1 * | 2/2003 | Grosvenor et al. ..... 348/207.99 |
| 2003/0133589 | A1 * | 7/2003 | Deguillaume et al. ....... 382/100 |
| 2004/0141555 | A1 * | 7/2004 | Rault et al. ............ 375/240.16 |
| 2006/0115145 | A1 * | 6/2006 | Bishop et al. ............. 382/155 |
| 2006/0182339 | A1 * | 8/2006 | Connell .................... 382/170 |
| 2006/0257048 | A1 * | 11/2006 | Lin et al. ................... 382/276 |
| 2007/0003130 | A1 * | 1/2007 | Goerick et al. ............ 382/153 |
| 2007/0025643 | A1 * | 2/2007 | Le Meur et al. ............ 382/298 |
| 2007/0185946 | A1 * | 8/2007 | Basri et al. ................ 708/200 |
| 2008/0123993 | A1 * | 5/2008 | Widdowson ............... 382/284 |

OTHER PUBLICATIONS

Antoniol et al., "A Markov random field approach to microarray image gridding," IEEE Proc. of the 17th Int. Conf. on Pattern Recog. (ICPR), UK, Aug. 23-24, 2004, pp. 550-553.

* cited by examiner

Primary Examiner—Vikkram Bali
Assistant Examiner—Michelle Entezari

(57) ABSTRACT

In a method of evaluating an image for a dominant line, warped mesh information regarding saliency of the image is received. Displacements of components of the warped mesh information are determined relative to corresponding components in un-warped mesh information. Statistical representations of the displacements are utilized to evaluate the image for a dominant line.

20 Claims, 17 Drawing Sheets

400

SUM SALIENCY VALUES OF AN AREA OF PIXELS IN AN IMAGE SALIENCY MAP IN A DEFINED DIRECTION RELATIVE TO THE SALIENCY MAP.
410

DIVIDE THE IMAGE SALIENCY MAP INTO A SET OF REGIONS IN RESPONSE TO THE SUMMING.
420

UTILIZE POSITION INFORMATION PERTAINING TO THE SET OF REGIONS TO DEFINE A WARPED MESH REPRESENTATION OF SALIENCY OF THE SALIENCY MAP.
430

EXPORT A REPRESENTATION OF THE WARPED MESH.
440

RECEIVING WARPED MESH INFORMATION REGARDING SALIENCY OF AN IMAGE.
1105

↓

DETERMINING DISPLACEMENTS OF COMPONENTS OF THE WARPED MESH INFORMATION RELATIVE TO CORRESPONDING COMPONENTS IN UN-WARPED MESH INFORMATION.
1115

↓

UTILIZING STATISTICAL REPRESENTATIONS OF THE DISPLACEMENTS TO EVALUATE THE IMAGE FOR A DOMINANT LINE.
1125

```
RECEIVING DOMINANT LINE INFORMATION RELATED TO AN
IMAGE.
1610
```

↓

```
EVALUATING THE DOMINANT LINE INFORMATION.
1620
```

↓

```
DETERMINING A DIRECTION OF MOVEMENT OF THE IMAGE IN A
PRESENTATION, WHEREIN THE DIRECTION OF MOVEMENT IS
BASED UPON THE EVALUATING OF THE DOMINANT LINE
INFORMATION.
1630
```

↓

```
DETERMINING A SPEED OF MOVEMENT OF THE IMAGE IN THE
PRESENTATION, WHEREIN THE SPEED OF MOVEMENT IS BASED
ON THE EVALUATING OF THE DOMINANT LINE INFORMATION.
1640
```

FIG. 16

IMAGE DOMINANT LINE DETERMINATION AND USE

TECHNICAL FIELD

Embodiments of the present technology relate to methods and systems for image analysis and more specifically to technology for determining and using the dominant line of an image.

BACKGROUND ART

The evolution of automated photo slideshow type presentations on personal computers, projected displays, and entertainment devices has become increasingly common as users amass large collections of digital images. A number of the methods used to display these slideshow type presentations incorporate some form of animation such as panning around on an image or moving an image within a viewing region in an attempt to make the presentation more interesting. Some forms of this type of animation are commonly known as "auto-rostruming" or the "Ken Burns effect."

Currently such automated applications of image movement or panning are fairly crude and typically applied in a random fashion. Sometimes this random application of movement and panning may generate an acceptable or interesting result, such as when an image of a tall building is randomly panned up or down to show the profile of the building in the same manner that human eyes would normally scan an actual tall building. However, current automated animation methods are just as likely (and often more likely) to produce a movement or panning animation that is not acceptable and instead detracts from an image or images being displayed in a slideshow type presentation.

BRIEF DESCRIPTION OF THE DRAWINGS

The accompanying drawings, which are incorporated in and form a part of this specification, illustrate embodiments of the presented technology and, along with the detailed description, serve to explain principles discussed below:

FIG. 4 is a flow diagram of a method for generating a warped mesh representation of image saliency from an image saliency map of an image, according to one embodiment of the present technology.

FIG. 11 is a flow diagram of a method for evaluating an image for a dominant line, according to one embodiment of the present technology.

FIG. 16 is a flow diagram of a method for determining image movement within a presentation, in accordance with embodiments of the present technology.

Figure 1:
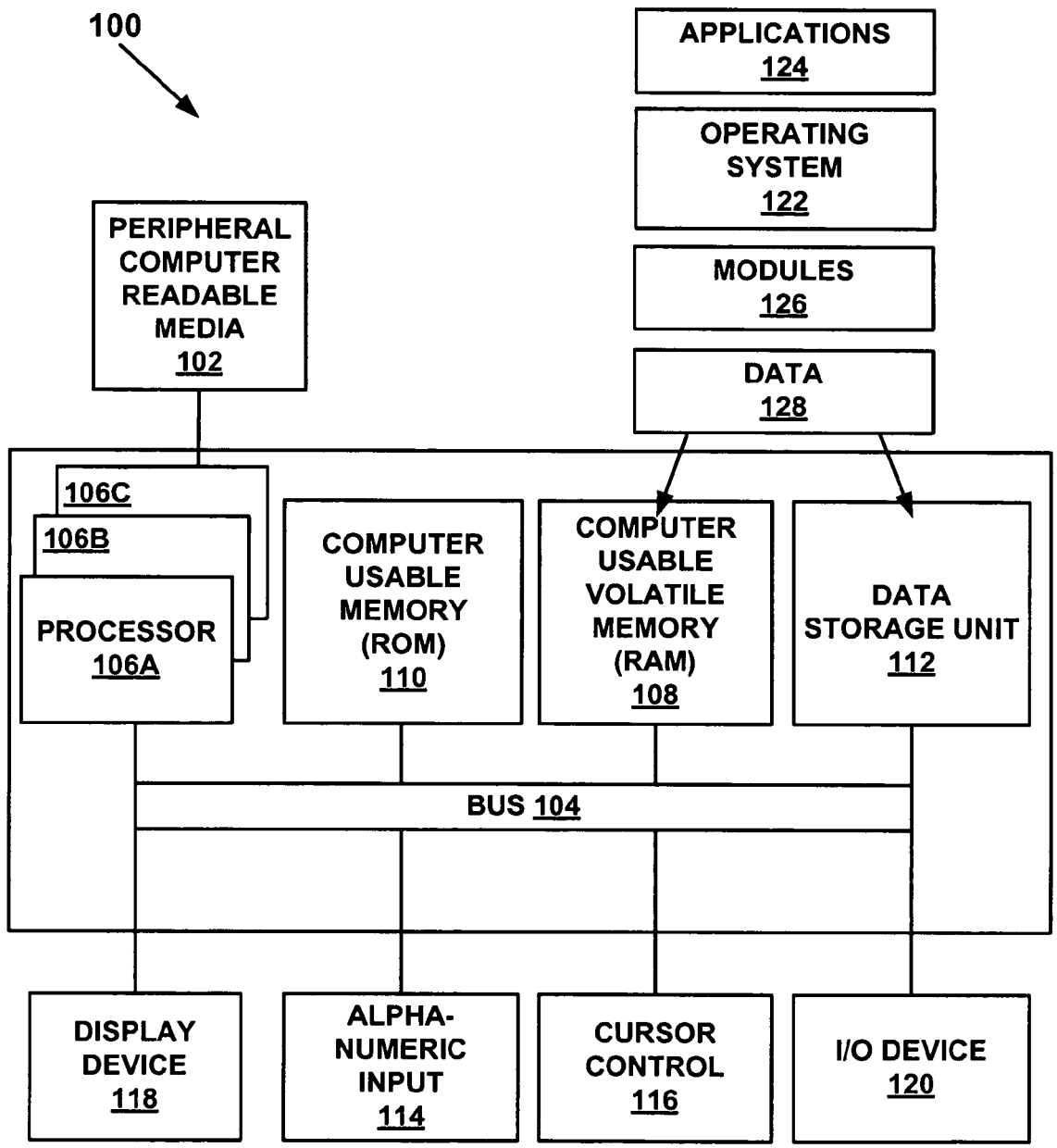
FIG. 1 is a diagram of an exemplary computer system used in accordance with embodiments of the present technology.

The drawings referred to in this description should not be understood as being drawn to scale unless specifically noted.

DETAILED DESCRIPTION

Reference will now be made in detail to embodiments of the present technology, examples of which are illustrated in the accompanying drawings. While the present technology is described in conjunction with various embodiments, it will be understood that they are not intended to limit the present technology to these embodiments. On the contrary, the presented technology is intended to cover alternatives, modifications and equivalents, which may be included within the spirit and scope the various embodiments as defined by the appended claims. Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present technology.

Unless specifically stated otherwise as apparent from the following discussions, it is appreciated that throughout the present detailed description, discussions utilizing terms such as "receiving", "determining", "utilizing", "evaluating", "characterizing", "locating", or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical, virtual, and mechanical computers. Additionally, it should be understood that in embodiments of the present technology, one or more of the steps can be performed manually.

Overview

Image dominant lines are an artistic concept discussed in by Bruce Block in his book, *The Visual Story*, copyright 2001. The essence of a dominant line is the visual flow of an image. Not all images have a dominant line or a strong dominant line. However, in some images, the image content creates a visual flow, or dominant line, that is in a particular axis with respect to the image. Bruce Block postulates that appropriate use of dominant line with respect to image movement can generate emotion for a viewer. For instance, consider a landscape image which exhibits a horizontal dominant line across an X-axis of an image. According to Bruce Block panning along this horizontal line generates a peaceful feeling for a viewer, while panning in opposition to this dominant line (up and down) generates a dissonant feeling in the user. Likewise, Bruce Block also indicates that the axis of a dominant line in an image has some control over the subconscious emotion that a user experiences when viewing the image. For example, images with horizontal dominant lines generate a relaxed feeling, images with diagonal dominant lines generate a passionate or intense feeling, and images with vertical dominant lines generate a feeling somewhere in between.

Filmmakers, photographers, and other image artists manually (with their eyes) identify dominant lines in images and exploit them to control the feelings experienced by viewers of their images. The present technology provides methods and systems for the automated detection and use of dominant lines when creating image presentations. With respect to this detailed description, an exemplary computer system with which embodiments of the present technology may operate will be described. An image panning system in accordance with the present technology will then be described. The discussion will start with an overview of this system, and then move on to describe the structure and operation of individual components of the image panning system, such as a warped mesh generator and a pan direction determiner. Although a variety of line drawings are used in conjunction with the examples illustrated herein, it should be appreciated that these line drawings (i.e., FIGS. 5, 13, 14, and 15) are represent exemplary digital images and/or photographs that the technology described herein is intended to operate upon.

Example Computer System Environment

With reference now to FIG. 1, portions of the present technology are composed of computer-readable and computer-executable instructions that reside, for example, in computer-usable media of a computer system. That is, FIG. 1 illustrates one example of a type of computer that can be used to implement embodiments, which are discussed below, of the present technology. FIG. 1 illustrates an exemplary computer system 100 used in accordance with embodiments of the present technology. It is appreciated that system 100 of FIG. 1 is exemplary only and that the present technology can operate on or within a number of different computer systems including general purpose networked computer systems, embedded computer systems, routers, switches, server devices, client devices, various intermediate devices/nodes, stand alone computer systems, multi-media devices, image display devices, digital cameras, handheld electronic devices, and the like. As shown in FIG. 1, computer system 100 of FIG. 1 is well adapted to having peripheral computer readable media 102 such as, for example, a floppy disk, a compact disc, digital versatile disk, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands. System 100 is also well suited to receiving inputs (such as alphanumeric inputs) and/or to having a cursor directed by other means such as, for example, voice commands. Additionally, in some embodiments, alphanumeric input 114 is configured for inputting non-alphabetic language characters, such as Kanji characters. System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology, for example, is stored as an application 124 or module 126 in memory locations of RAM 108 and/or memory areas of data storage unit 112.

Exemplary System for Generating an Image Presentation

Figure 2:
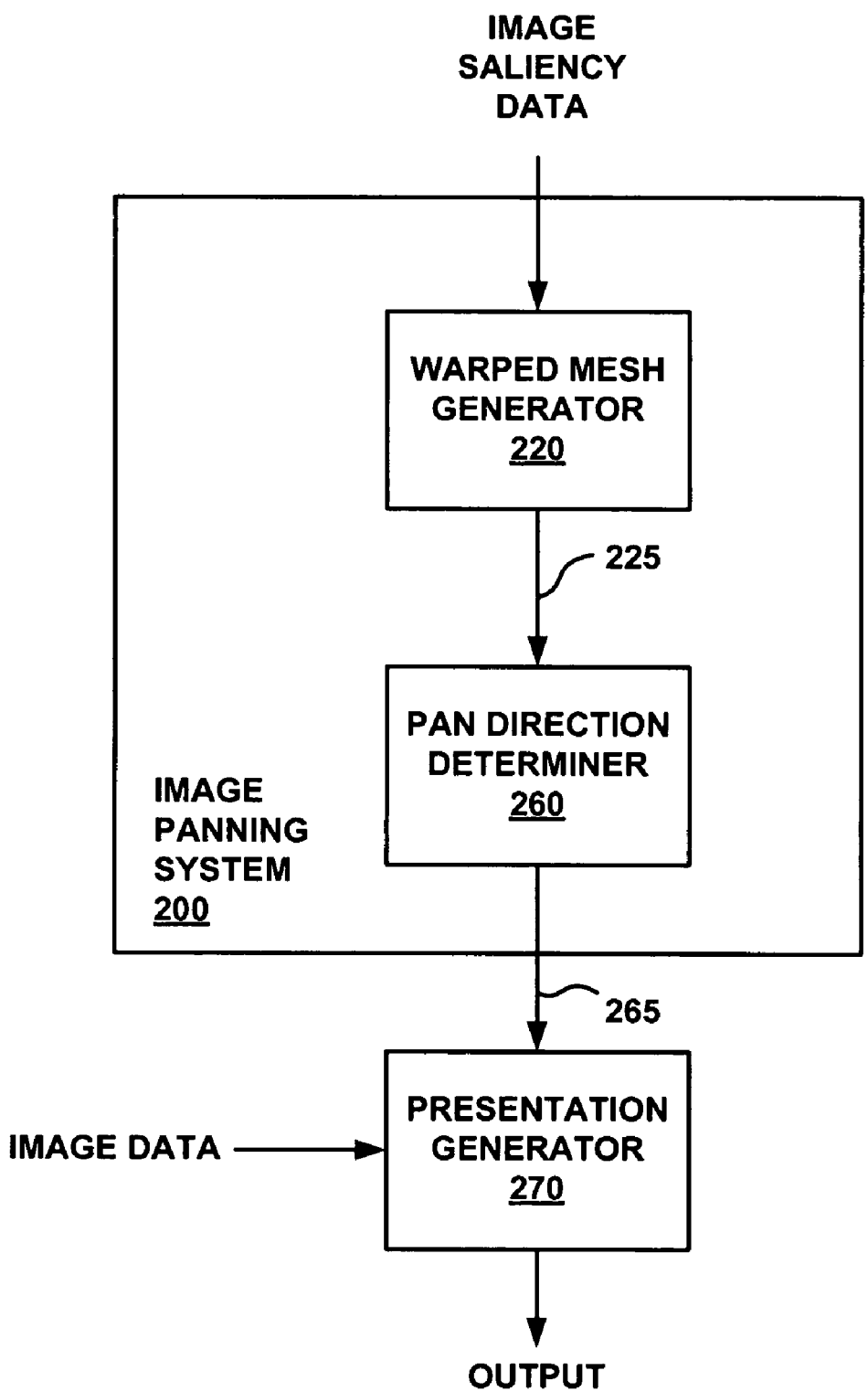
FIG. 2 is a block diagram of an exemplary image panning system, according to one embodiment of the present technology.

With reference now to FIG. 2, a block diagram is shown of an image panning system 200, in accordance with one embodiment of the present technology. The following discussion will begin with an overview description of the structure of system 200. Discussion will proceed with a detailed description of the structure and operation of the warped mesh generator 220. Discussion will conclude with a description of the structure and operation of the pan direction determiner 260.

Structure of the Present Image Panning System

As shown in FIG. 2, image panning system 200 is comprised of a warped mesh generator 220, and pan direction determiner 260. Warped mesh generator 220 generates a warped mesh representation of the saliency of the image saliency data for an image. Warped mesh generator 220 receives image saliency data as an input and outputs warped mesh data derived from the image saliency data. In one embodiment this warped mesh data is coupled, such as via coupling 225 to pan direction determiner 260. Pan direction determiner 260 determines the direction and/or speed of movement of an image based on information from warped mesh generator 220. In one embodiment, where image panning system 200 does not include a warped mesh generator, warped mesh information is received as an input instead of being generated within image panning system 200. Pan direction determiner 260 also has an output 265 for outputting pan direction determinations to other portions of a larger image processing system, such as presentation generator 270. For example presentation generator 270 receives image data for an image and also receives pan determination information from pan direction determiner 260. Based on these inputs, presentation generator 270 automatically builds a presentation, such as a slideshow type presentation, which is output. Presentation generator 270 uses the pan direction determinations to automatically incorporate intelligent presentation animations, such as image direction and/or speed of movement/panning based on image content analysis performed by image panning system 200.

As shown in FIG. 2, warped mesh generator 220 receives saliency information to be converted in to warped mesh representations of image saliency. In one embodiment, the saliency information can be received in the form of saliency maps. Warped mesh generator 220 has an output 225 for outputting warped mesh information about image saliency, such as positional data that describes the warped mesh. Warped mesh generator 220 is also coupled to pan direction determiner 260 for providing information pertaining to warped mesh representations of image saliency, such as positional information that describes the warped mesh.

As shown in FIG. 2, pan direction determiner 260 is coupled with warped mesh generator 220 for receiving information about warped mesh representations of image saliency. Pan direction determiner 260 has an output 265 for outputting pan direction determinations to other portions of a larger image processing system, such as presentation generator 270. By coupling to pan direction determiner 260, presentation generator 270 receives information which allows for intelligent panning and movement of images in a manner that complements the content of the image or images being presented, for example, in a slide show type presentation. This is an improvement over systems which merely choose image movements and/or pan directions at random or without consideration to the content of the image.

Structure of a Warped Mesh Generator

Figure 3:
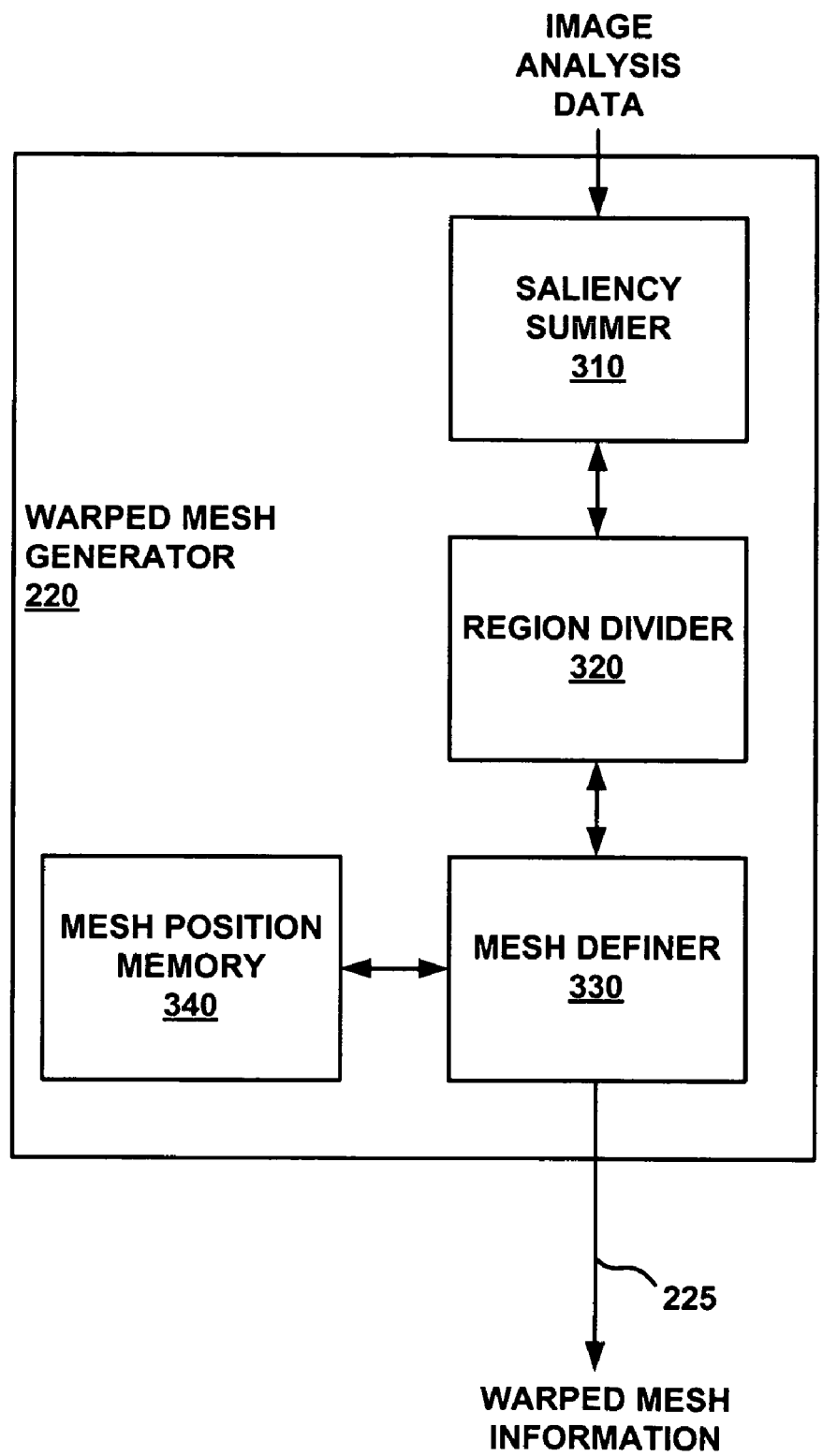
FIG. 3 is an expanded block diagram of a warped mesh generator in accordance with one embodiment of the present technology.

FIG. 3 is a block diagram of an exemplary warped mesh generator 220, in accordance with one embodiment of the present technology. In the embodiment shown in FIG. 3, warped mesh generator 220 is comprised of a saliency summer 310, a region divider 320, a mesh definer 330, and an optional mesh position memory 340. Other embodiments of warped mesh generator 220 are optionally comprised of multiple saliency summers and multiple region dividers for performing tasks in parallel.

In FIG. 3, saliency summer 310 receives image saliency data about the saliency of an image as an input from an exterior source, such as from an image saliency generator, an image saliency receiver, or a user input. In one embodiment of the present technology, the image saliency data is received in the form of a saliency map of an image. Saliency summer 310 performs summations of the image saliency data. Saliency summer 310 is also coupled with region divider 320 and receives instructions from region divider 320 about where to begin and end summations that are performed on image saliency data. Saliency summer 310 also provides results of saliency data summations to region divider 320 via this coupling.

In FIG. 3, region divider 320 is coupled with saliency summer 310 and also to mesh definer 330. Region divider 320 is for dividing a saliency map into regions in response to summations performed by saliency summer 310. In one embodiment of the present technology, region divider 320 is loaded with preset data defining the number and type of regions that saliency data for images are to be divided into. In one embodiment of the present technology, region divider 320 is also loaded with preset information defining the percentage of total saliency of the image that is to be placed in each of the regions. Region divider 320 provides this information as needed to control the operation of saliency summer 310, and to divide the image saliency data for each image into the proper number and type of regions with each region containing the prescribed amount of the total image saliency for the image. In one embodiment of the present technology, region divider 320 is also coupled with an external source that provides information, such as user-defined inputs, to alter or change the presets on region numbers, region types, and percentage of total saliency contained in each individual region. Region divider 320 is also coupled with mesh definer 330 for providing information about the locations of the regions the image saliency data is divided into.

Mesh definer 330 is coupled with region divider 320 and receives information regarding the locations of the regions that the saliency data for an image is divided into. Mesh definer 330 utilizes position information pertaining to the regions to define a warped mesh representation of saliency of the image saliency map. In one embodiment of the present technology, mesh definer 330 marks the areas that separate each individual region from another region within a set of regions. These separation areas may be referred to specifically as border line separators or boundary line separators, and generically as separators. In one embodiment, position information that defines a warped mesh representation is then stored. In one embodiment of the present technology, position information that defines a warped mesh representation of image saliency is provided to an output of warped mesh generator 220, such as output 225. In one embodiment, for example, position information that defines a warped mesh representation of image saliency is provided to a pan direction determiner 260 via coupling 225.

In one embodiment of the present technology, mesh definer 330 is also coupled with optional mesh position memory 340. Mesh position memory 340 provides storage for position information which defines a warped mesh, such as the position information about boundary line separators, border line separators, or region separators between individual regions of a warped mesh.

Operation of the Present Warped Mesh Generator

The following discussion sets forth in detail the operation of an embodiment of a warped mesh generator utilized in conjunction with the present technology. It is appreciated that, techniques for recognizing objects and determining salient (or interesting) portions of images are known, and described in works such as, A Model of Saliency-Based Visual Attention for Rapid Scene Analysis, Laurent Itti, Christof Koch, and Ernst Niebur, IEEE Transactions on Pattern Analysis and Machine Intelligence, November 1998; and Robust Real-Time Object Detection, Paul Viola and Michael Jones, Second International Workshop on Statistical and Computational Theories of Vision—Modeling, Learning, Computing, and Sampling, Jul. 13, 3001. In addition, Robust Real-Time Object Detection, also describes a technique for summing saliency horizontally and vertically in an image.

As shown in the block diagram of FIG. 3, image saliency summer 310 receives image saliency data, which identifies important or interesting sections in images. Image saliency data for an image comprises information such as saliency maps, facial recognition information, and other image analysis information. Image saliency summer 310 receives saliency data that is generated based on well-known and established image processing techniques, such as techniques for determining saliency and recognizing objects such as faces. In some embodiments, the image saliency information that is received is also generated based on user-specified parameters or constraints that are incorporated into the generation of the saliency data. The image saliency data for an image is received in a form such as a ranking or mapping of salient areas of the image. For instance, in some embodiments of the present technology the image saliency data is received as a grayscale image or mapping, where the value of each pixel is the saliency score for that pixel. In other embodiments of the present technology image saliency data is passed in the form of a map that is divided into sub-sections with each sub-section containing a score indicating its relative saliency.

Referring now to FIG. 4, flow diagram 400 of FIG. 4 will be discussed in conjunction with FIGS. 3 and 5-9 to describe operation of embodiments of the present technology. For purposes of this discussion, the operation of an embodiment of warped mesh generator 220 that receives a saliency map in the form of a gray-scale image comprised of pixels will be described. It should be realized, that the same method of operation applies generally to any form of saliency map that is received.

FIG. 4 is a flow diagram 400 of a method for generating a warped mesh representation of image saliency from an image saliency map of an image, according to one embodiment of the present technology. The image can be a still image or, in some embodiments a moving image (e.g. video). Although specific steps are disclosed in flow diagram 400, such steps are exemplary. That is, embodiments of the present technology are well suited to performing various other (additional) steps or variations of the steps recited in flow diagram 400. It is appreciated that the steps in flow diagram 400 may be performed in an order different than presented, and that not all of the steps in flow diagram 400 may be performed. In one embodiment of the present technology, flow diagram 400 is implemented as computer-readable program code stored in a memory unit of computer system (such as computer system 100 of FIG. 1) and executed by processor (such as processor 106A of FIG. 1).

Figure 5:
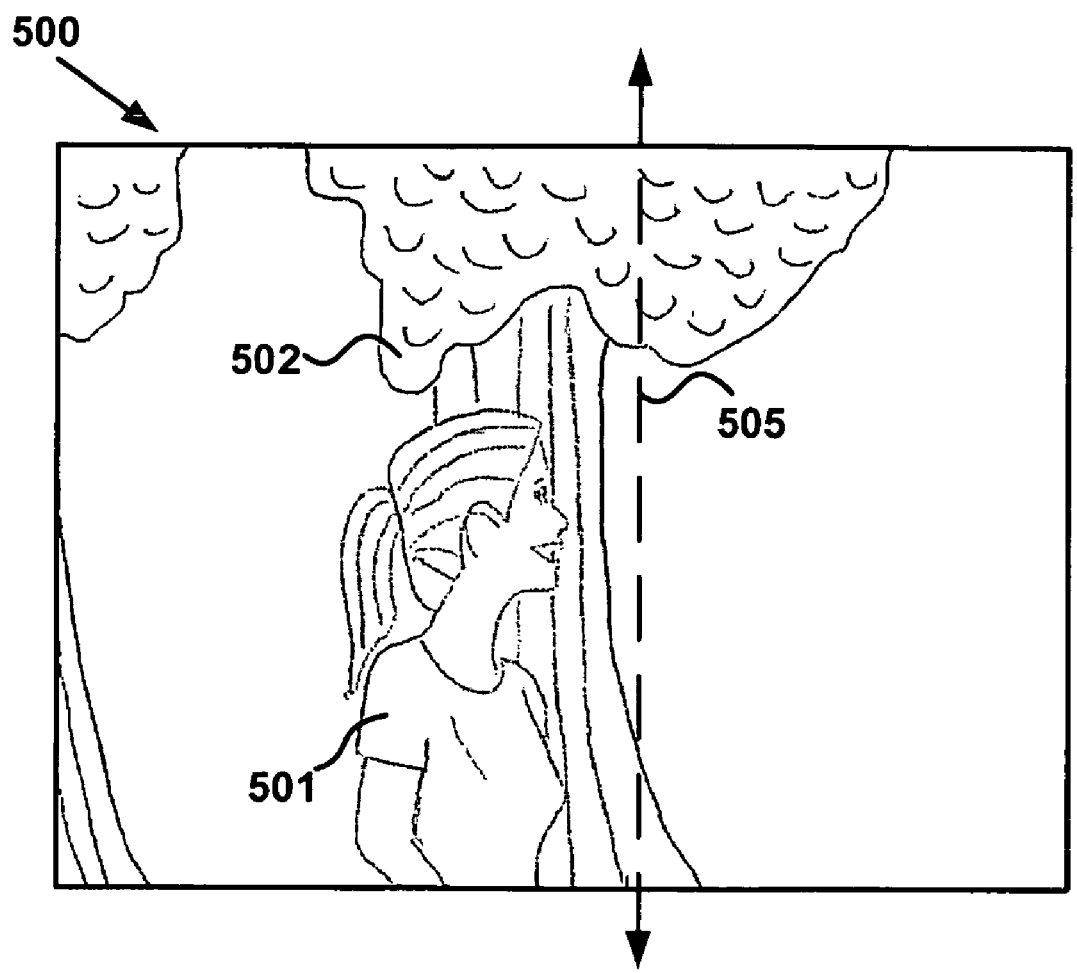
FIG. 5 is an exemplary image to be converted to a warped mesh representation of saliency, in accordance with embodiments of the present technology.

FIG. 5 shows an exemplary image 500 to be converted to a warped mesh representation of saliency, in accordance with embodiments of the present technology. The most salient portions of image 500 are the woman 501 and the tree 502 she is standing in front of. The left side of image 500 also contains some salient features in the form of parts of tree and branches. The right one-quarter of the image is nearly devoid of salient features. Dashed line 505 shows that the visually discernable dominant line of image 500 is oriented vertically along a y-axis. Dominant line 505 is in-line with the trunk of tree 502 and the vertical profile of woman 501. As will be seen, the present technology allows for automatically determining the direction and in some embodiments the strength of image dominant lines, such as dominant line 505.

Figure 6:
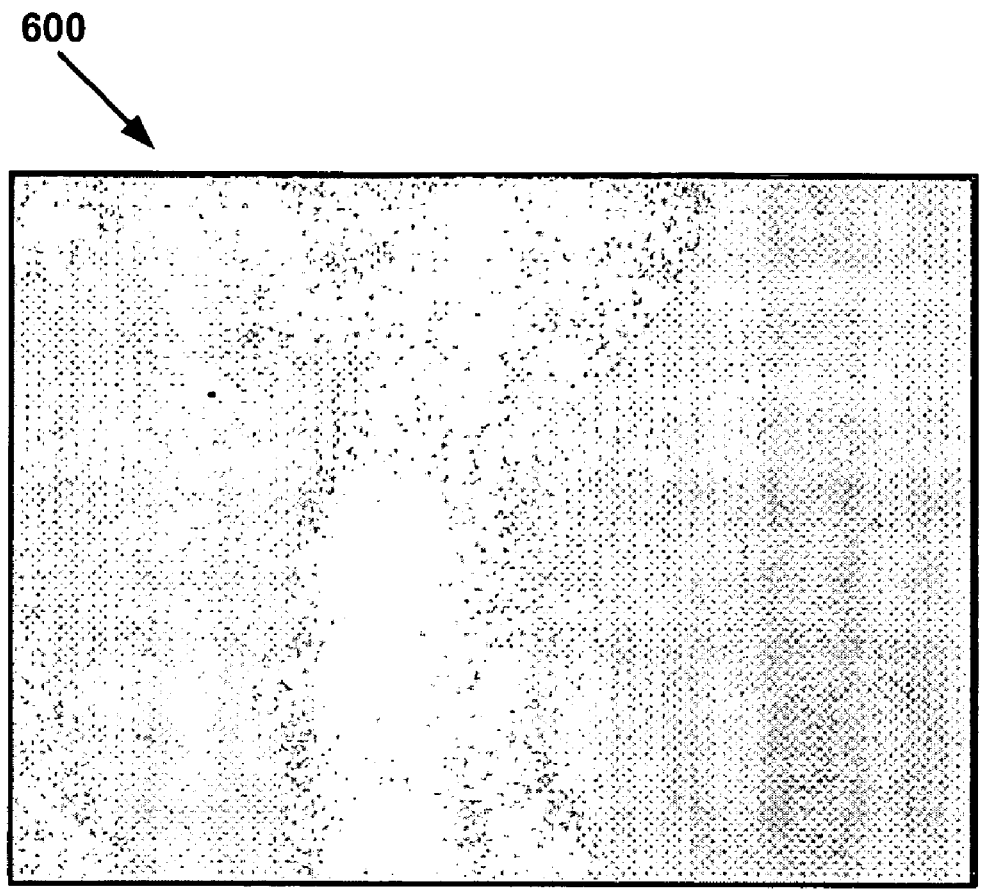
FIG. 6 is an exemplary saliency map of an image utilized as an input in accordance with various embodiments of the present technology.

FIG. 6 shows an exemplary gray-scale saliency map 600 of image 500. The most salient areas (woman 501 and tree 502) of image 500 are represented as lighter areas in image saliency map 600. The darker areas of the gray-scale image represent the less salient areas of image 500. Exemplary image saliency map 600 is utilized as an input to warped mesh generator 220 in the following discussion.

In 410 of FIG. 4, in one embodiment of the present technology, saliency values of an area of pixels in a saliency map are summed in a defined direction relative to the saliency map. In one embodiment of the present technology, saliency summer 310 receives saliency data in the form of a saliency map 600 of an image 500. If a value of the total saliency contained in the saliency map is not provided, saliency summer 310 calculates it. Saliency summer 310 then operates in conjunction with region divider 320 to sum up saliency values of areas of pixels in the saliency map. The areal summing of pixels is carried out in defined horizontal, vertical, or diagonal directions relative to saliency map 600. Start and stop points, and the direction of the summing are controlled by presets or via interaction with region divider 320.

Summing can be performed one time in a single defined direction, or multiple times in multiple defined directions. For instance a first summing can take place diagonally from the upper-right side to the lower-left side of image saliency map 600, from the lower-left side to upper-right side of image saliency map 600, from the left side to the right side of image saliency map 600, from the top to the bottom of image saliency map 600, and etc. As an example, in one embodiment of the present technology a horizontal summing starts at the right side of image saliency map 600, and an entire column of pixels is summed. Saliency summer 310 then moves leftward horizontally to the next column of pixels, sums it, and adds it to the sum of the first column of pixels. Summing continues leftward, horizontally across image saliency map 600 in this fashion. A running summation total is kept, and summing ceases when the running total reaches a desired level, such as a certain percentage of the total saliency of the image saliency map, as specified in a preset or as specified by region divider 320. The running total is then reset and summing continues on horizontally across image saliency map 600 in a similar fashion until all columns of pixels have been summed. Results of the summing are passed onward to region divider 320.

In an embodiment of the present technology where multiple summing passes are performed, additional summing is then performed in another direction or directions. For instance, a second summing then takes place vertically from the top to the bottom or bottom to top of image saliency map 600. As an example, in one embodiment of the present technology, a vertical summing starts at the top of image saliency map 600, and an entire row of pixels is summed. Saliency summer 310 then moves vertically downward to the next row of pixels, sums it, and adds it to the sum of the first row of pixels. Summing continues vertically downward in image saliency map 600 in this fashion. A running summation total is kept, and summing ceases when the running total reaches a desired level, such as a certain percentage of the total saliency of the image saliency map, as specified in a preset or as specified by region divider 320. The running total is then reset and summing continues on vertically downward in image saliency map 600 in a similar fashion until all rows of pixels have been summed. Results of the summing are then passed onward to region divider 320.

In 420 of FIG. 4, in one embodiment of the present technology, the saliency map is divided into a set of regions in response to the summing. The sizes of the regions are based on the percentage of total saliency contained in each region. In one embodiment of the present technology, region divider 320 controls the summing of saliency summer 310 to effect this division into regions. The control is based on preset values or user-specified values. For instance, in one embodiment of the present technology, region divider 320 contains a preset to divide an image saliency map into a set of one hundred vertical regions of equal percentage. In another embodiment of the present technology, illustrated in FIG. 7, region divider 320 contains presets to divide a saliency map into a set of ten horizontal regions and a set of ten vertical regions, with each horizontal region and each vertical region containing ten percent of the total saliency of the image saliency map. Similarly, in one embodiment illustrated in FIG. 8, region divider 320 contains presets to divide a saliency map into a set of ten upper-left to lower-right diagonal regions each containing ten percent of the total saliency of the image saliency map and ten lower-left to upper-right diagonal regions each containing ten percent of the total saliency of the image saliency map. Numerous such presets can exist, and can divide an image saliency map into greater or fewer regions and into regions at various orientations. It takes less time and processing to divide an image saliency map in to fewer regions, but the resultant warped mesh representation of saliency is less precise. It takes more time and processing to divide an image saliency map into more regions, but the resultant warped mesh representation of saliency is more precise.

Figure 7:
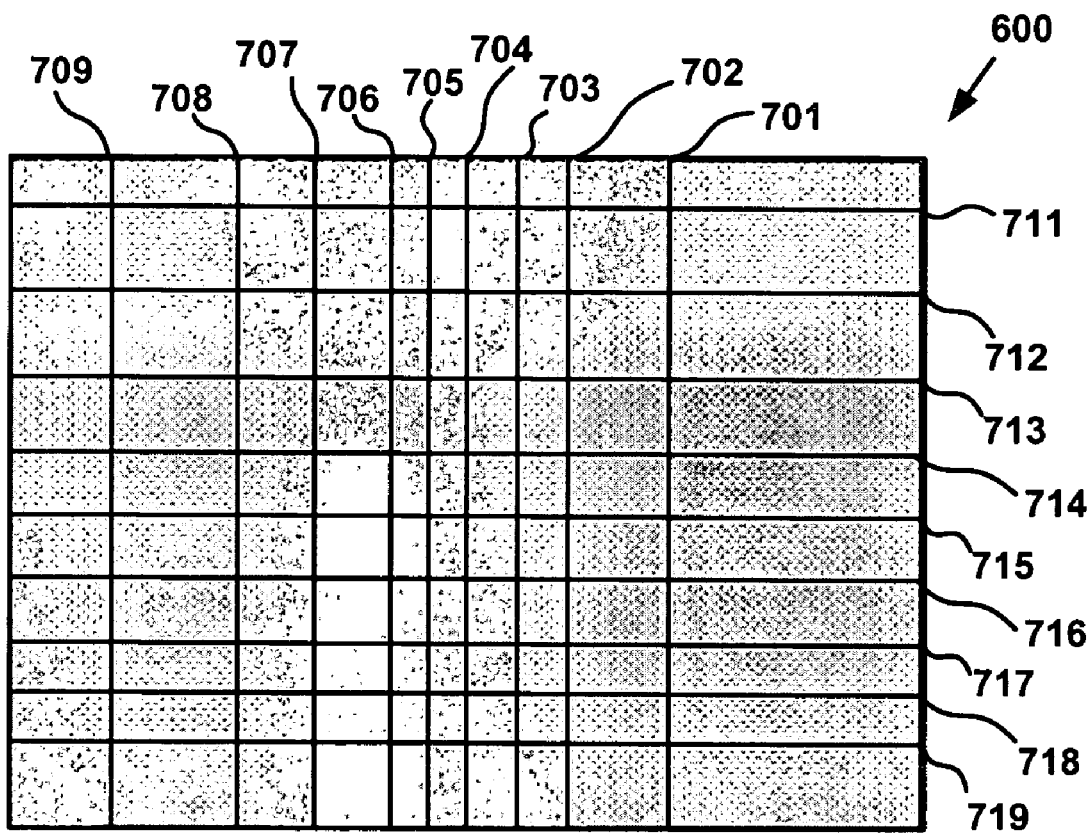
FIG. 7 is a warped mesh representation of image saliency superimposed on an exemplary image saliency map, according to one embodiment of the present technology.

FIG. 7 shows image saliency map 600 divided into ten vertical regions and ten horizontal regions, in accordance with one embodiment of the present technology. In FIG. 7, a horizontal summing was performed, and image saliency map 600 was divided into ten vertical regions with each vertical region containing ten percent of total saliency of image saliency map 600. Boundary line separators between each of the vertical regions are represented as black vertical lines 701, 702, 703, 704, 705, 706, 707, 708, 709, and are superimposed on image saliency map 600 to visually define the vertical regions. Boundary line separators are represented visually for explanatory purposes, however it should be appreciated that they have no physical dimensions, but are instead represented by a coordinate distance away from a selected origin. The real-space area taken up by each region in FIG. 7 is not uniform. This is because areas of saliency vary throughout image 500 and therefore throughout image saliency map 600. This results in boundary line separators between regions that are not regularly spaced, but instead form a warped mesh with each individual region comprising a different physical area while comprising a prescribed percentage of total image saliency.

FIG. 7 also shows image saliency map 600 divided into ten horizontal regions, in accordance with one embodiment of the present technology. In addition to the previously described horizontal summing, a vertical summing has also been performed. As a result of the vertical summing image saliency map 600 is divided into ten horizontal regions with each horizontal region containing ten percent of the total saliency of image saliency map 600. Border line separators between each of the horizontal regions which resulted from the vertical summing are represented as black horizontal lines 711, 712, 713, 714, 715, 716, 717, 718, 719, and are superimposed on image saliency map 600 to visually define the regions. Border line separators are represented visually for explanatory purposes, however it should be appreciated that they have no physical dimensions, but are instead represented by a coordinate distance away from a selected origin. As a result of the horizontal summing and vertical summing, FIG. 7 shows image saliency map 600 superimposed with a warped mesh that is comprised of one hundred sub-regions, which do not necessarily each contain one percent of the total saliency of image saliency map 600.

Figure 8:
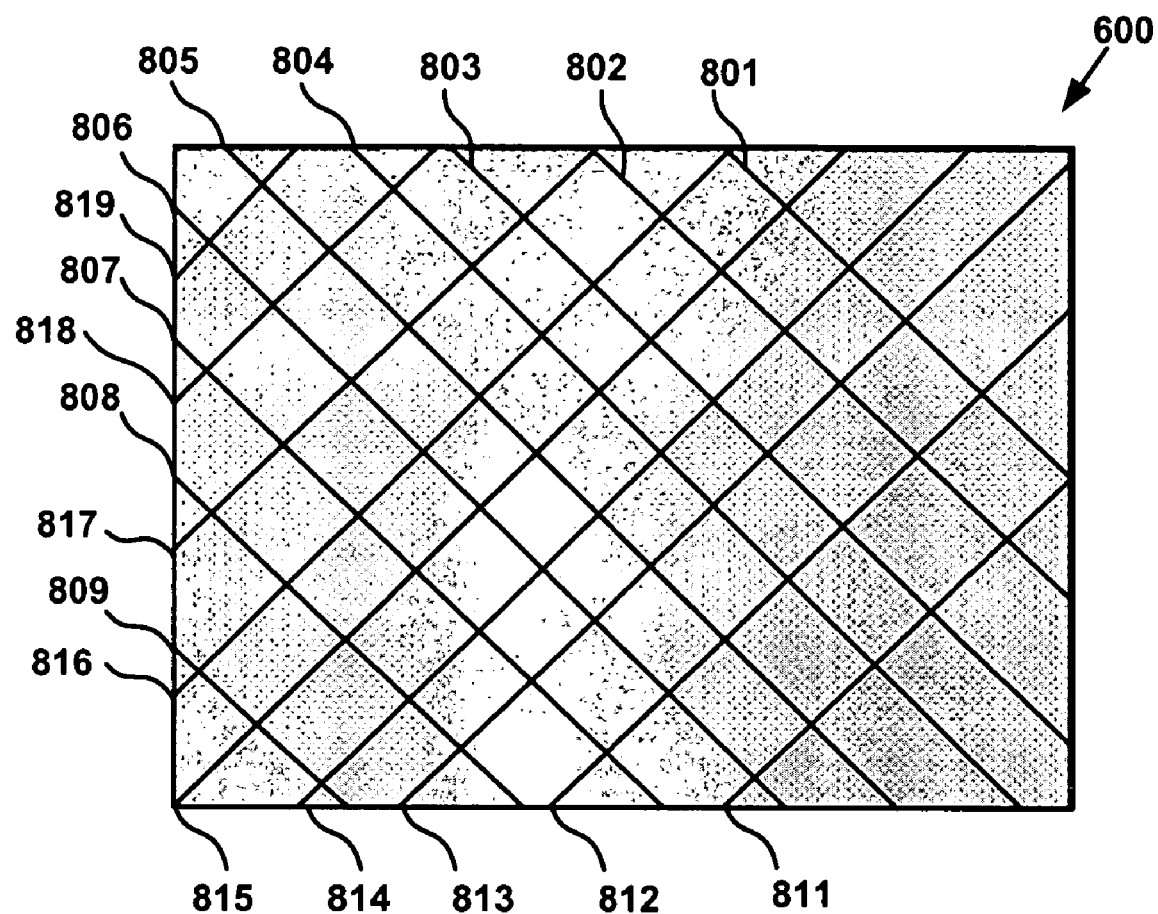
FIG. 8 is a warped mesh representation of image saliency superimposed on an exemplary image saliency map, according to one embodiment of the present technology.

FIG. 8 is another warped mesh representation of image saliency superimposed on an exemplary image saliency map, according to one embodiment of the present technology. In FIG. 8, however, rather than summing the pixels of image saliency map 600 in horizontal and vertical directions, the pixels have been summed in orthogonal diagonal directions. Region separators 801, 802, 803, 804, 805, 806, 807, 808, and 809, are oriented at approximately a forty-five degree angle to horizontal and proceed from upper-left to lower-right of saliency map 600. Region separators 801-809 divide saliency map 600 into a set of ten diagonal regions of approximately equivalent saliency. Region separators 811, 812, 813, 814, 815, 816, 817, 818, and 819, are oriented approximately orthogonal to region separators 801-809 and proceed from lower-left to upper-right of saliency map 600. Region separators 811-819 divide saliency map 600 into another set of ten diagonal regions of approximately equivalent saliency. Together, region separators 801-809 and region separators 811-819 saliency map 600 into a warped mesh that is comprised of one hundred sub-regions which do not necessarily each contain one percent of the total saliency of image saliency map 600.

In 430 of FIG. 4, in one embodiment of the present technology, position information pertaining to the set of regions is used to define a warped mesh representation of saliency of the image saliency map. Position information about the set or sets of regions is passed from region divider 320 to mesh definer 330. Mesh definer 330 then uses this position information to define a warped mesh, which represents the saliency of the image saliency map. In one embodiment of the present technology, this position information is used to mark boundary line separators, border line separators, and region separators between regions in the set or sets of regions.

Following the example of the exemplary embodiment of a two-dimensional mesh that was shown in FIG. 7, the location of each boundary line separator (701-709) between the individual vertical regions in the vertical set of regions is noted and its location is marked. In one embodiment of the present technology, the location of each individual boundary line separator is marked as a defined distance from a specified origin. For instance, in one embodiment of the present technology, the specified origin is in the top right corner, and the boundary line separators (701-709) are each marked by their distance in pixels from the origin. Following such a scheme, the ten vertical regions can be defined with nine separate integer numbers that represent the distances of the nine boundary line separators from the defined origin. Likewise, border line separators between the individual horizontal are then noted and marked. In the example embodiment being followed, the ten horizontal regions would be defined by nine separate integer numbers that represent the distances of the nine border line separators (711-719) from the defined origin. In the described embodiment of the present technology, the set of ten vertical regions and the set of ten horizontal regions shown in FIG. 8, which together comprise one hundred sub-regions, are represented by eighteen integers. This is a substantial memory savings over the size of storing the actual image saliency data of image saliency map 600.

Figure 9:
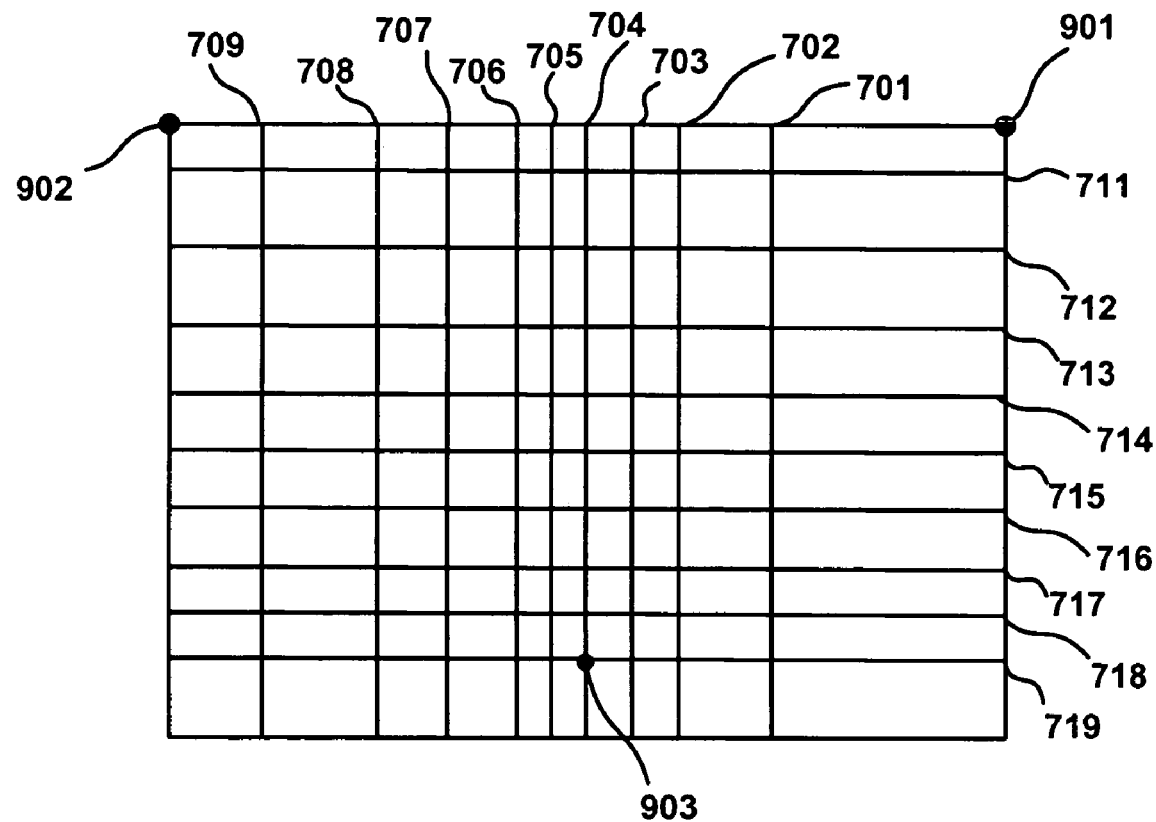
FIG. 9 is an exemplary warped mesh representation of image saliency, according to one embodiment of the present technology.

FIG. 9 is a warped mesh representation 900 of image saliency, according to one embodiment of the present technology. The image saliency map 600 that was present in FIG. 7 has been removed, and all that remains are the vertical boundary line separators 701-709 and the horizontal border line separators 711-719. Vertical boundary line separators 701-709 represent an exemplary one-dimensional warped mesh. Horizontal border line separators 711-719 also represent another exemplary one-dimensional warped mesh. Together, separators 701-709 and separators 711-719 comprise exemplary two-dimensional warped mesh 900. Similarly, a two-dimensional diagonal warped mesh can be defined by region separators 801-809 and region separators 811-819 of FIG. 8.

In FIG. 9, an origin 901 is shown in the top right corner of warped mesh 900, however in other embodiments the origin can be defined elsewhere such as at position 902 in the top left corner. An exemplary intersection of separator 704 and separator 719 is shown as nodal intersection 903. As previously indicated, position information for a warped mesh such as warped mesh 900 can be represented by eighteen integers. In one embodiment, these integers can be pixel distances from a defined origin. In another embodiment, these integers can represent a fractional or percentage distances across an image from a defined origin that is then stored as an integer, for instance a fractional distance of 0.102 can be stored as the integer number 102. Although integer representations of warped mesh positional information are utilized here (and elsewhere) as examples, it is appreciated that such warped mesh positional information can be represented in by any computer representation of numbers, including: real numbers, fixed point numbers, floating point numbers, floating point equivalents of fractional numbers, binary numbers, and etc. In one embodiment of the present technology, position information for warped mesh 900 can be stored in a memory, such as optional mesh position memory 340 of FIG. 3. In one embodiment of the present technology, position information for warped mesh 900 is supplied as an output from warped mesh generator 220.

In 440 of FIG. 4, in one embodiment of the present technology, a representation of the warped mesh is exported. In one embodiment, as shown in FIG. 2, where warped mesh generator 220 is included in system 200, position information for a warped mesh, such as the integer values that represent warped mesh 900, is supplied to pan direction determiner 260 so movements of an image can be determined based on the warped mesh information.

Structure of a Pan Direction Determiner

Figure 10:
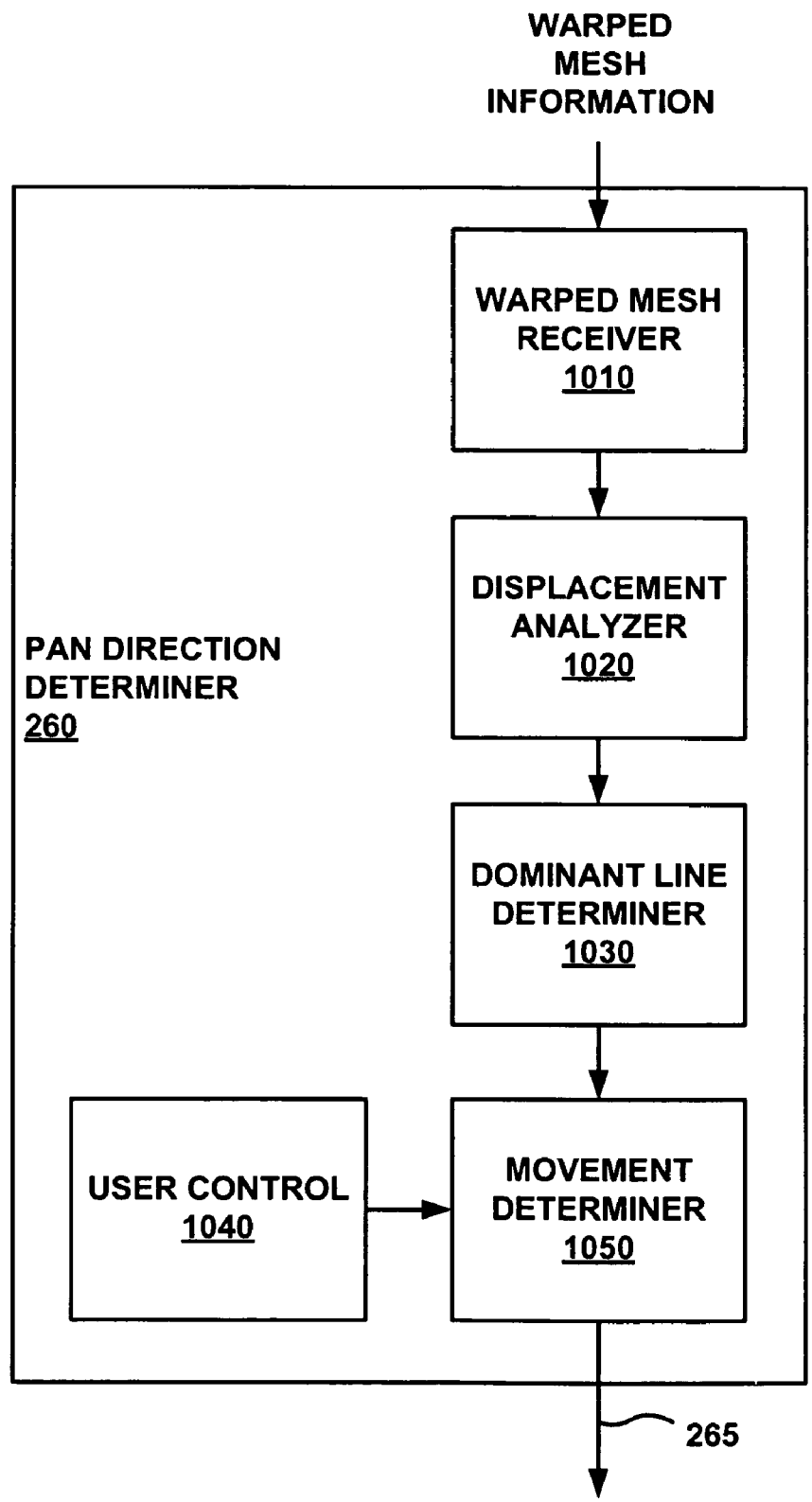
FIG. 10 is an expanded block diagram of an pan direction determiner, according to one embodiment of the present technology.

FIG. 10 is an expanded block diagram of pan direction determiner 260 in accordance with one embodiment of the present technology. In the embodiment illustrated in FIG. 10, pan direction determiner 260 is comprised of a warped mesh receiver 1010, a displacement analyzer 1020, a dominant line determiner 1030, an optional user control 1040, a movement determiner 1050 and an output coupling 265.

In FIG. 10, warped mesh receiver 1010 receives a warped mesh representation of an image as an input. In one embodiment, warped mesh receiver 1010, receives data which defines warped mesh information. For example, in one embodiment warped mesh receiver 1010 receives a two-dimensional warped mesh, such as warped mesh 900, as an input. In one embodiment, warped mesh receiver 1010 performs a buffering function and is coupled with displacement analyzer 1020 for providing warped mesh positional information as an input. In one embodiment, warped mesh receiver 1010 also performs a conversion function and provides warped mesh information to displacement analyzer 1020 in a form that it is needed in.

In FIG. 10, displacement analyzer 1020 analyzes displacements of components in a received warped mesh. In one embodiment, displacement analyzer 1020 also performs the functions of optional warped mesh receiver 1010, thus eliminating the need for a separate warped mesh receiver. The displacements of received warped mesh components are determined relative to corresponding component locations in a similarly oriented un-warped mesh with regularly spaced region separators which define regions of equal saliency/area. The displacements are then statistically analyzed. For example, the locations of vertical separators in a warped mesh are compared to locations of vertical separators in an un-warped mesh. Displacement analyzer 1020 provides displacement determination results and statistical analyses of displacements to dominant line determiner 1030.

In FIG. 10, dominant line determiner 1030 locates a dominant line within an image by comparing results received from displacement analyzer 1020. If a dominant line exists, dominant line determiner 1030 determines the dominant line's axis of orientation based on the comparison. For instance, dominant line determiner 1030 compares received horizontal separator statistical displacement information to received vertical separator statistical displacement information, for instance via a ratio, to determine if a horizontal or vertical dominant line exists. Likewise, dominant line determiner compares statistical displacement information for upper-left to lower-right diagonal separators to statistical displacement information for lower-left to upper-right diagonal separators to determine if a diagonally oriented dominant line exists, and if so, what its axis of orientation is. Thus, in one embodiment, dominant line determiner 1030 is configured for automatically locating dominant lines which are oriented substantially in a horizontal, vertical, or diagonal axis in an image that the warped mesh data is related to. Based on such comparisons, dominant line determiner 1030 also determines the strength of any dominant line that is detected. Dominant line information is then provided to movement determiner 1050 from dominant line determiner 1030.

In FIG. 10, movement determiner 1050 is used to classify the direction and strength of a dominant line. Based on the direction of the dominant line, movement determiner 1050 determines the direction of movement of an associated image within a viewing region when the image is shown in a presentation. Similarly, based on the strength of a detected dominant line, movement determiner 1050 determines the speed of movement of an image displayed in a viewing region as part of a presentation. In one embodiment, the classifications are based on presets or user inputs which dictate, for instance, that a certain number of images will be panned/moved vertically, a certain number panned/moved horizontally, and a certain number panned/moved vertically. Movement determinations are provided to an output 265, and can be used as an input to a presentation generator, such as presentation generator 270.

In FIG. 10, optional user control 1040 is coupled with movement determiner 1050. In one embodiment, optional user control 1040 provides an input mechanism, such as through hardware or software, for a user to alter any preset or predetermined value utilized by movement determiner 1050 to judge or classify the direction and/or strength of one or more dominant lines as determinations are made as to direction and speed of an image's movement in a presentation.

Operation of the Present Pan Direction Determiner

Referring now to FIGS. 11 and 16, flow diagrams 1100 and 1600 will be discussed to describe operation of elements of embodiments of the present technology. For purposes of this discussion a detailed operational description will be provided of an embodiment of the present technology that utilizes a two-dimensional horizontal/vertical warped mesh 900 as an input and can optionally use a two-dimensional diagonal/diagonal warped mesh (shown in FIG. 8) as an input. Other embodiments and variations are possible, within the spirit and scope of this invention.

Although specific steps are disclosed in flow diagrams 1100 and 1600, such steps are exemplary. That is, embodiments of the present technology are well suited to performing various other (additional) steps or variations of the steps recited in flow diagrams 1100 and 1600. It is appreciated that the steps in flow diagrams 1100 and 1600 may be performed in an order different than presented, and that not all of the steps in flow diagrams 1100 and 1600 may be performed. In one embodiment of the present technology, flow diagram 1100 and/or flow diagram 1600 is implemented as computer-readable program code stored in a computer useable medium, such a memory unit or peripheral computer media used with of computer system 100 (FIG. 1), and executed by processor 106A, and/or processors 106A, 106B, and 106B (FIG. 1).

FIG. 11 is a flow diagram 1100 of a method of evaluating an image for a dominant line, according to one embodiment of the present technology.

In 1105 of FIG. 11, in one embodiment of the present technology, a warped mesh representation of an image is received. Warped mesh receiver 1010 receives this warped mesh representation of an image. The warped mesh representation is received in the form of positional information that is used to describe a mesh or grid. In one embodiment warped mesh information is received as positional information describing a two-dimensional mesh representation of an image. Horizontal/vertical warped mesh 900 and the diagonal/diagonal warped mesh shown in FIG. 8 are examples of such two-dimensional warped meshes. Information for a two-dimensional warped mesh can be received in the form of location information for separators of a mesh, or can be received as information pertaining to the location of the intersecting nodes of a two-dimensional mesh. In one embodiment, warped mesh information is received as integer values.

While in other embodiments, warped mesh information is received as real numbers, fixed point numbers, floating point numbers, or some other computerized representation of numbers. Warped mesh receiver 1010 buffers warped mesh information and provides it to displacement analyzer 1020 when needed. In one embodiment, warped mesh receiver 1010 also performs a conversion function, such as converting separator information into nodal intersection information or converting integer information into decimal information, or else converting information in one type of computerized representation of numeric values into information in another type of computerized representation of numeric values (i.e. converting binary information to floating point information). For simplicity and ease of explanation decimal and/or integer values are shown and discussed in many of the examples displayed herein, though it is appreciated that such values are typically represented in some other numeric form within a computer.

For example, in one embodiment of the present technology, displacement analyzer 1020 utilizes warped mesh positional information that is defined in terms of decimal equivalents of percentage distances between a defined origin and an opposite edge of a normalized image area. In one such embodiment, the normalized image area has a zero value at the defined origin and a value of one at image area edges opposite the origin at right angles. For instance, utilizing exemplary two-dimensional warped mesh 900, with position 902 defined as an origin, Table 1 shows the decimal representations of the percentage distances of each boundary line separator 701-709 to the right of position 902. Table 1 also shows the decimal representation of the percentage distances of each border line separator 711-719 below position 902.

TABLE 1

Example Positional Information for Separators in an Exemplary Warped Mesh

| Boundary line separators | Border line separators |
|---|---|
| 709 = 0.102 | 711 = 0.166 |
| 708 = 0.281 | 712 = 0.321 |
| 707 = 0.336 | 713 = 0.446 |
| 706 = 0.387 | 714 = 0.544 |
| 705 = 0.426 | 715 = 0.637 |
| 704 = 0.469 | 716 = 0.725 |
| 703 = 0.512 | 717 = 0.793 |
| 702 = 0.559 | 718 = 0.845 |
| 701 = 0.633 | 719 = 0.896 |

The values shown in Table 1 can be received by warped mesh receiver 1010 in integer format in the form of warped mesh positional information, and then converted as necessary for use displacement analyzer 1020. As shown in Table 1, boundary line separator 709 of FIG. 9 is displaced rightward from position 902 by approximately 10% (0.102) of the distance across the area modeled by warped mesh 900. Similarly, border line separator 711 is displaced downward from position 902 approximately 17% (0.166) of the up/down distance in the area modeled by warped mesh 900. Though they are represented as decimal values in Table 1, another embodiment of displacement analyzer 1020 can manipulate and utilize the same positional information in the form of integer values, fixed point numbers, floating point numbers, binary numbers, or some other computerized representation of numeric values. It should be appreciated that a two-dimensional warped mesh, such as warped mesh 900, inherently comprises data for two one-dimensional warped meshes. Another example of a conversion is converting two-dimensional warped mesh positional information received as separator positional information into nodal intersection positions of the intersections of the separators.

In 1115 of FIG. 11, in one embodiment of the present technology, displacements of components in the received warped mesh are determined relative to locations of corresponding components in an un-warped mesh. Displacement analyzer 1020 performs this analysis. In one embodiment, this analysis is performed on both dimensions of a two-dimensional warped mesh. While in one embodiment, this analysis is performed on nodal intersections of a two-dimensional warped mesh, or on some other representation of the data of the warped mesh.

Figure 12:
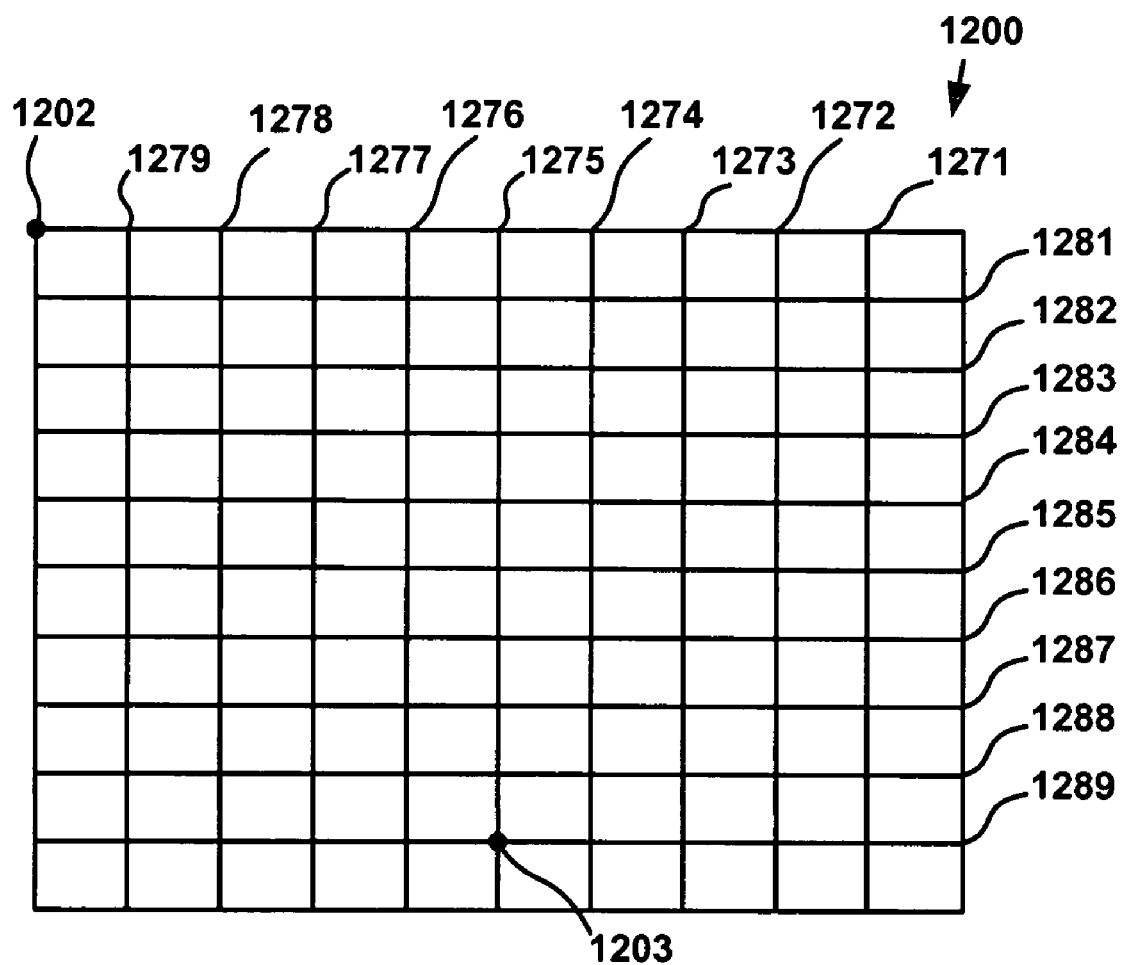
FIG. 12 is an exemplary un-warped mesh representation of an image with uniformly average saliency, according to one embodiment of the present technology.

In one embodiment, to perform the analysis, each dimension of a received warped mesh is compared to a similarly constructed dimension of an un-warped mesh. For instance, each dimension of a two-dimensional horizontal/vertical warped mesh 900 would be compared to its corresponding dimension in an un-warped two-dimensional horizontal/vertical mesh. Such an un-warped mesh would have nine regularly spaced horizontal separators and nine regularly spaced vertical separators representing an image with a uniform distribution of saliency across the entire image area. FIG. 12 shows such an un-warped mesh 1200, with regularly spaced vertical boundary line separators 1271-1279 and regularly spaced horizontal border line separators 1281-1291. Boundary line separators 1271-1279 correspond to boundary line separators 701-709 in FIG. 9, while border line separators 1281-1291 correspond to border line separators 711-719 of FIG. 9. The regularly spaced region separators of FIG. 12 define ten horizontal regions of equal area/saliency and ten vertical regions of equal area/saliency.

TABLE 2

Example Positional Information for Separators in an Exemplary Un-warped Mesh

| Boundary line separators | Border line separators |
| --- | --- |
| 1279 = 0.100 | 1281 = 0.100 |
| 1278 = 0.200 | 1282 = 0.200 |
| 1277 = 0.300 | 1283 = 0.300 |
| 1276 = 0.400 | 1284 = 0.400 |
| 1275 = 0.500 | 1285 = 0.500 |
| 1274 = 0.600 | 1286 = 0.600 |
| 1273 = 0.700 | 1287 = 0.700 |
| 1272 = 0.800 | 1288 = 0.800 |
| 1271 = 0.900 | 1289 = 0.900 |

Table 2 shows positional information for un-warped mesh 1200, in a corresponding format to the positional information shown for warped mesh 900 within Table 1. Displacements in Table 2 are represented as decimal equivalents of percentages of total right-left or up-down distance from origin 1202. Un-warped mesh 1200 is normalized in the same manner as warped mesh 900. As with Table 1, it should be appreciated that the displayed decimal values are exemplary, and can be represented and manipulated as other real number values, fixed point numbers, floating point numbers, binary numbers, or some other computer representation of numeric values.

In the case of a horizontal/vertical warped mesh, displacement analyzer 1020 determines a first statistical representation, such as a standard deviation, of displacements for a first set of separator components which are oriented parallel to one another. For example, displacement analyzer 1020 finds the difference between each boundary line separator in the received warped mesh 900 and its corresponding regularly spaced boundary line separator in un-warped mesh 1200. For instance, displacement analyzer 1020 starts with either the one-dimensional warped mesh represented by boundary line separators 701-709 or the one-dimensional warped mesh defined by border line separators 711-719. Assuming for example that the one-dimensional warped mesh comprised of boundary line separators 701-709 is processed first, the difference between the position of boundary line 709 and its corresponding regularly spaced boundary line 1279 is calculated as 0.102 minus 0.100. Thus, the difference from un-warped position is 0.002. This calculation is repeated for the remaining received boundary line separators 708-701 and their corresponding un-warped boundary line separators 1278-1271. Once all the differences have been found, a statistical analysis is performed to determine a statistical representation of the differences. In one embodiment of the present technology, a standard deviation in a horizontal distance from the un-warped mesh vertical boundary line separator locations is determined. In this example, the standard deviation is approximately 0.125. In another embodiment of the present technology, a geometric mean of the differences, a sum of the absolute values of the differences, or some other statistical representation is determined.

Next, displacement analyzer 1020 determines a second statistical representation, such as a standard deviation, of displacements for a second set of separator components which are oriented parallel to one another and are also oriented substantially orthogonal to the first set of separators. Following the previous example, displacement analyzer 1020 repeats the calculation with the remaining positional information for the second one-dimensional warped mesh comprised of horizontal border line separators 711-719. Displacement analyzer 1020 finds the difference between each border line separator in the received warped mesh 900 and its corresponding regularly spaced border line separator in the un-warped mesh 1200. For instance, the difference between the position of border line separator 711 and its corresponding regularly spaced border line separator 1281 is calculated as 0.166 minus 0.100. Thus, the difference from un-warped position is 0.066. This calculation is repeated for the remaining received border line separators 712-719 and their corresponding un-warped border line separators 1282-1289. Once all the differences have been found, a statistical analysis is performed to determine a statistical representation of the differences. In one embodiment, a standard deviation in a vertical distance from the un-warped mesh horizontal border line separator locations is determined. In this example, the standard deviation is approximately 0.052. In another embodiment of the present technology, a geometric mean of the differences, sum of the absolute values of differences, or some other statistical representation will be determined for the differences.

If another two-dimensional warped mesh is received, such as a diagonal/diagonal warped mesh, displacement analyzer 1020 repeats the above described process for the second two-dimensional warped mesh. As before, statistical representations of the differences between the separator components of each of each one-dimensional warped mesh are calculated relative to the similarly oriented components in an un-warped diagonal/diagonal mesh that defines diagonal regions of equal saliency/area. Unlike the case of the horizontal/vertical warped mesh, such separators in such a diagonal/diagonal un-warped mesh will not be uniformly spaced from one another. Thus, in the case of a diagonal/diagonal warped mesh, displacement analyzer 1020 determines a first statistical representation, such as a standard deviation, of displacements for a first set of separator components which are oriented parallel to one another and which are also oriented at approximately a forty-five degree angle to a horizontal axis of an image. Displacement analyzer then determines a second statistical representation, such as a standard deviation, of displacements for a second (remaining) set of separator components which are oriented parallel to one another and are also oriented substantially orthogonal to the first set of separators.

In another embodiment of the present technology that utilizes nodal intersection locations of a two-dimensional warped mesh instead of border line and boundary line type separator locations, the nodal intersection locations of the received warped mesh are compared to the locations of nodal intersections in a similarly constructed un-warped mesh. Differences in the locations are calculated and a statistical analysis is performed to determine statistical representations of the differences. Node 903 (FIG. 9) and node 1203 (FIG. 12) are examples of corresponding nodes in a received warped mesh 900 and an un-warped mesh 1200. In one embodiment of the present technology, the two-dimensional displacements of the received nodes from the locations of their corresponding un-warped nodes are noted, and standard deviations of the displacements of the received nodes are calculated. In another embodiment a geometric mean of the differences of the nodal position displacements, a summation of the absolute values of the nodal position displacements, or some other statistical representation of the differences is determined.

In 1125 of FIG. 11, in one embodiment of the present technology, statistical representations of the displacements of the warped mesh separator components are utilized to evaluate an image for a dominant line. Dominant line determiner 1030 (FIG. 11) performs this evaluation. For example, in one embodiment, dominant line determiner 1030 evaluates a standard deviation of displacements of a first set of separator components of a warped mesh with respect to a standard deviation of displacements of a second set of separator components of the warped mesh. This can comprise, for example, evaluating a ratio of the first standard deviation to the second standard deviation. A result of the evaluating represents a directional axis and/or strength of a dominant line of the image.

The example standard deviations calculated for two-dimensional warped mesh 900 provide insight on how dominant line determiner 1030 quantifies the direction and/or strength of a dominant line in an image For instance, the horizontal standard deviation of vertical boundary line separators (701-709) is approximately 0.125, while vertical standard deviation of horizontal border line separators (711-719) is approximately 0.052. Evaluating a ratio of the horizontal standard deviation to the vertical standard deviation gives a measure of the dominant line of image 500 (FIG. 5). For instance, if the ratio (R) is greater than 1, the deviation in the horizontal direction is more pronounced than in the vertical direction, and the image has a vertical dominant line. Similarly larger values of R above one correlate to dominant lines of greater strength (in other words, the dominant line is more pronounced). Conversely, if the value of R is less than 1, the deviation in the vertical direction is more pronounced than in the horizontal direction and the image has a horizontal dominant line. Similarly smaller values of R below one correlate to horizontal dominant lines of greater strength (in other words, the dominant line is more pronounced). In one embodiment, a watch dog feature is built into dominant line determiner 1030, which causes dominant line determiner 1030 to substitute a very small value, such as 0.001, for any standard deviation that is equal to zero. This prevents divide by zero and infinity errors that could potentially result. Thus, in the current example, the ratio of 0.125 to 0.052 results in an R value of 2.4. This indicates a vertical dominant line of medium strength, oriented in a y-axis direction of image 500, as shown by line 505.

As demonstrated by the preceding example, utilizing warped mesh 900, dominant line determiner 1030 utilizes a comparison of a first statistical representation of displacements of a first set of components to a second statistical representation of displacements of a second set of components to evaluate image 500 for the presence of a dominant line. In the example given, image 500 was evaluated for the presence of a horizontal or vertical dominant line. Similarly, an orthogonal diagonal/diagonal warped mesh (as shown in FIG. 8) can be utilized to evaluate image 500 for an upper-right to lower-left diagonal dominant line or a lower-right to upper-left diagonal dominant line. In an example utilizing such a diagonal/diagonal warped mesh, a standard deviation of displacements of a first set of parallel separator components is compared to a standard deviation of displacements a second set of orthogonal separator components. Dominant line determiner 1030 then determines the diagonal axis and strength of any detected diagonal dominant line in the fashion described above in conjunction with example of horizontal/vertical mesh 900.

Figure 13:
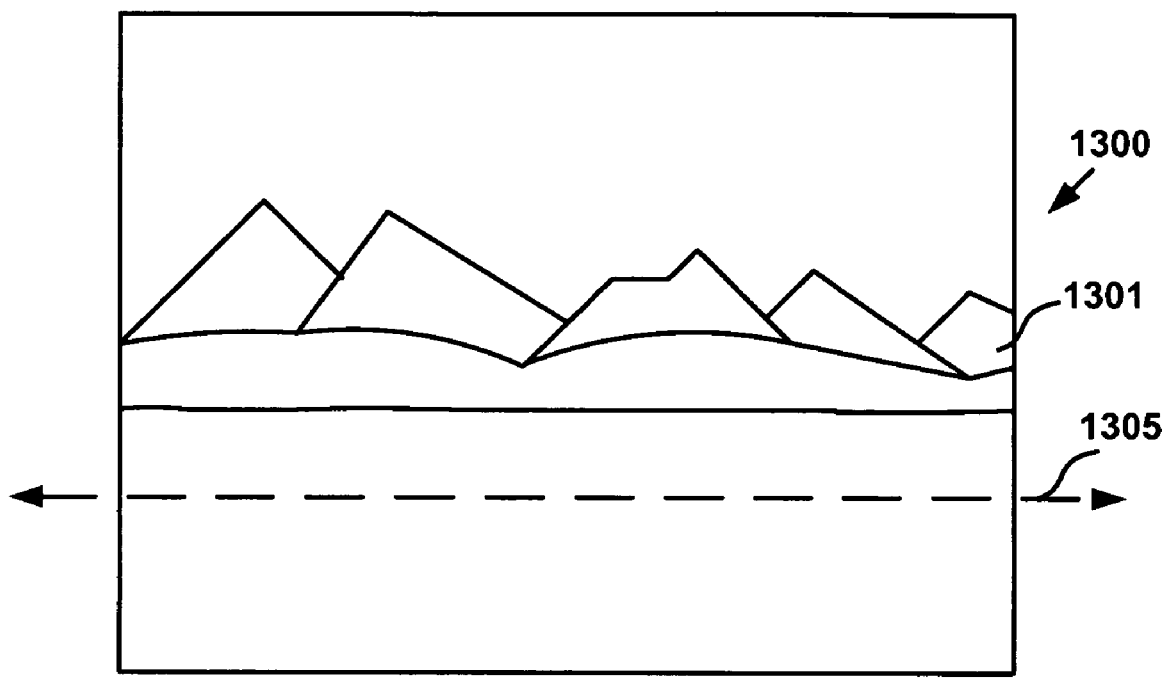
FIG. 13 shows an image with a horizontal dominant line, in accordance with embodiments of the present technology.

FIG. 13 shows an image 1300 with a horizontal dominant line 1305, in accordance with embodiments of the present technology. Image 1300 shows a landscape with mountains 1301 that extends substantially in a horizontal direction across a narrow band of image 1300. This creates a strong horizontal dominant line in direction 1305 along the x-axis of image 1301. In one embodiment, dominant line determiner 1030 detects the direction and strength of horizontal dominant line 1305 by using the method described in conjunction with flow diagram 1100.

Figure 14:
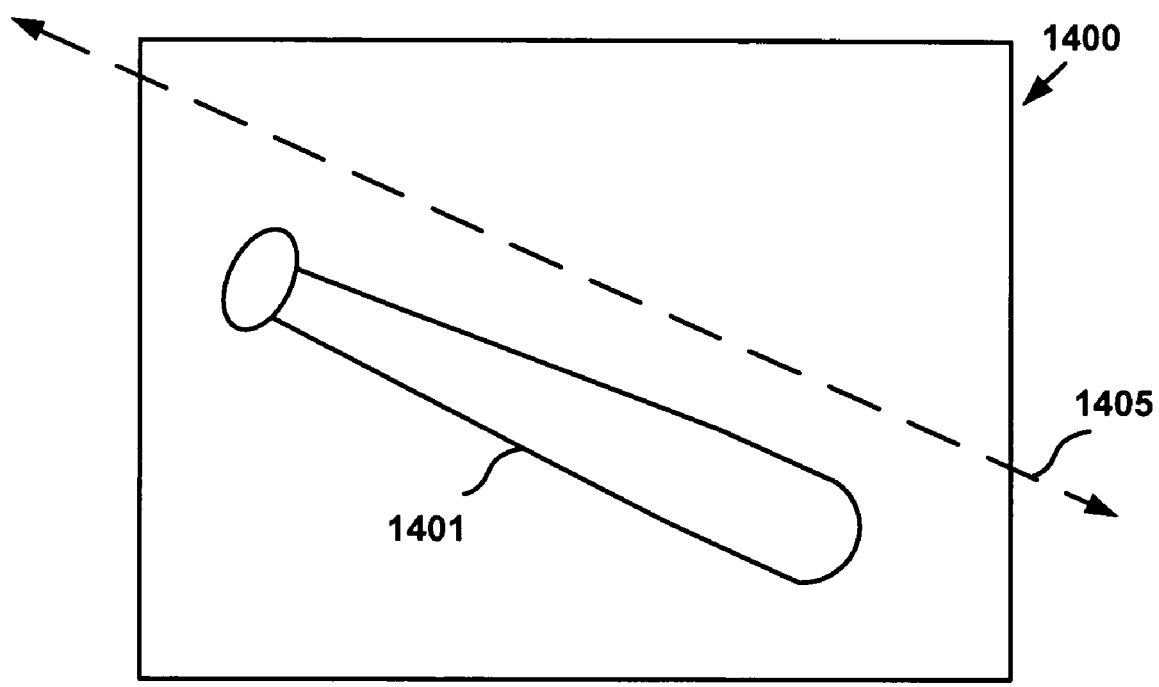
FIG. 14 shows an image with a diagonal dominant line, in accordance with embodiments of the present technology.

FIG. 14 shows an image 1400 with a diagonal dominant line 1405, in accordance with embodiments of the present technology. Image 1400 shows a baseball bat 1401 that extends substantially in an upper-left to lower-right diagonal across image 1400. This creates a strong diagonal dominant line in direction 1405 along the upper-left to lower-right diagonal axis of image 1401. In one embodiment, dominant line determiner 1030 detects the direction and strength of diagonal dominant line 1405 by using the method described in conjunction with flow diagram 1100.

Figure 15:
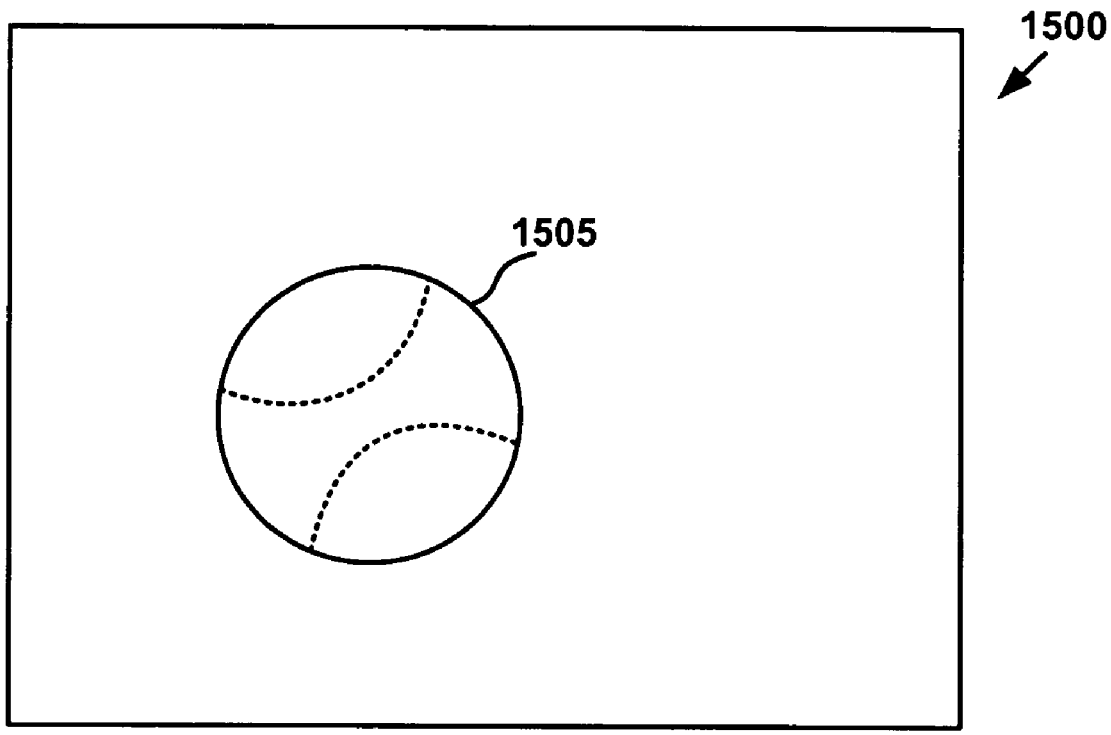
FIG. 15 shows an image with a negligible dominant line, in accordance with embodiments of the present technology.

FIG. 15 shows an image 1500 with a negligible dominant line, in accordance with embodiments of the present technology. Image 1500 shows a baseball that is positioned near the center of image 1500. This results in a negligible or negative determination when image 1500 is evaluated for a dominant line. In one embodiment, dominant line determiner 1030 detects the absence of a dominant line (or perhaps the existence of a very weak dominant line) by using the method described in conjunction with flow diagram 1100.

FIG. 16 is a flow diagram 1600 of a method for determining image movement within a presentation, according to one embodiment of the present technology.

In 1610 of FIG. 16, in one embodiment of the present technology, dominant line information related to an image is received. For example, in one embodiment, movement determiner 1050 receives the dominant line information from dominant line determiner 1030 (both shown in FIG. 10). The received dominant line information defines an axis or direction of a dominant line with respect to an image. The received dominant line information also coveys defines the relative strength of the dominant line. As an example, in one embodiment, the dominant line information comprises a numeric result that is determined from the evaluation of warped mesh representation of an image. Thus in the example described above, in conjunction with the evaluation of image 500 and warped mesh 900, the value of R, 2.4, is passed to movement determiner 1050. Similarly, in a case where numeric values are not used, information indicating a medium strength vertical dominant line is passed to movement determiner 1050.

Figure 17:
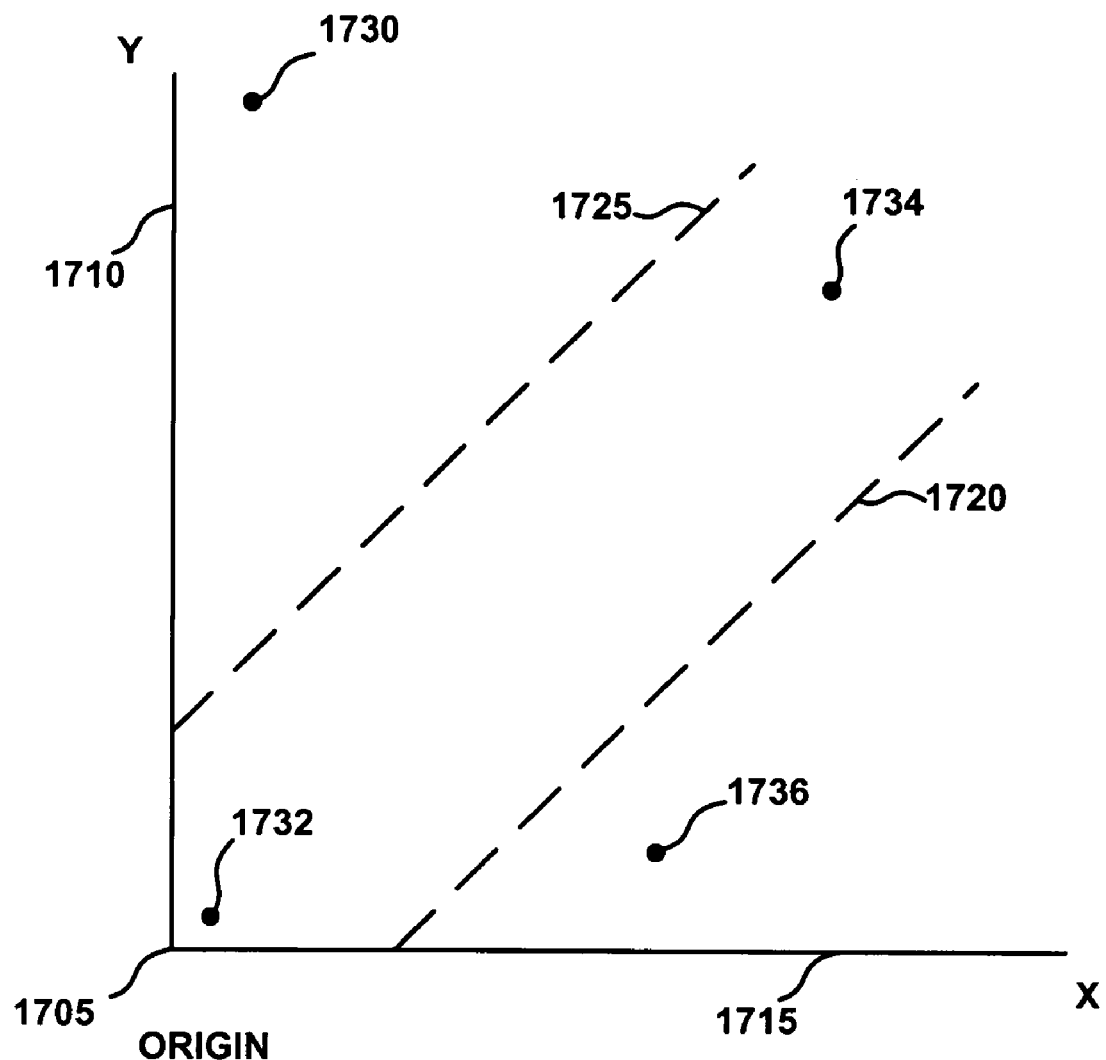
FIG. 17 shows an exemplary technique for evaluating dominant line information, in accordance with embodiments of the present technology.

In 1620 of FIG. 16, in one embodiment of the present technology, the received dominant line information is evaluated. In one embodiment, movement determiner 1050 performs an evaluation of the received dominant line information. In one embodiment, movement determiner 1050 simply evaluates dominant line information for each image independently based upon its direction and strength. In another embodiment however, movement determiner 1050 additionally evaluates the dominant line information for each image in conjunction with dominant line information for a plurality of images which are to be presented together in a presentation. In one such embodiment, the dominant line information for each of the plurality of images is additionally evaluated with respect to default settings, user inputs (such as from user control 1040), or both. Through such evaluations movement determiner 1050 characterizes a direction of a dominant line for an image based on the dominant line information and/or additionally in relation to default setting or user inputs. Through such evaluations, movement determiner 1050 also characterizes strength of a dominant line for an image based on the dominant line information. One example of a technique for evaluating dominant line information of a plurality of images involves plotting graph points representing the direction and relative strength of dominant lines of a plurality of images. FIG. 17 shows a plurality of such graph points plotted on an X-Y graph.

FIG. 17 shows an exemplary technique for evaluating dominant line information, in accordance with embodiments of the present technology. The graph of FIG. 17 is comprised of an x-axis 1715, a y-axis 1710, an origin 1705, and dividing lines 1725 and 1720. Point 1730 represents a vertical dominant line of medium strength, such as vertical dominant line 505 (FIG. 5). Point 1736 represents a horizontal dominant line of high strength, such as horizontal dominant line 1305 (FIG. 13). Point 1734 represents a diagonal dominant line of high strength, such as diagonal dominant line 1405 (FIG. 14). Point 1732 represents a negligible, almost non-existent dominant line associated with FIG. 15. In one embodiment, dividing lines 1720 and 1725 are determined by user inputs, such as from user control 1740. In another embodiment, dividing lines 1720 and 1725 are determined in accordance with default settings. Although two dividing lines (1720, or 1725) are shown, it is appreciated that other embodiments may user fewer or more such dividing lines. It is further appreciated that in other embodiments, such dividing lines can be located in different positions or at different angles, based upon user input, default settings, or both.

Consider an example, where a default setting indicates that 25% of a group of images should be panned or moved horizontally, 25% should be panned or moved vertically, and 50% should be panned or moved diagonally. Based on such requirements, movement determiner splits points 1730, 1732, 1734, and 1736 into three regions via placement of dividing lines 1720 and 1725. Points above dividing line 1725 are earmarked for vertical panning/movement, points below dividing line 1720 are earmarked for horizontal panning/movement, and points between dividing lines 1720 and 1725 are earmarked for diagonal panning/movement. Thus, it is possible in this technique that an image may be panned in a direction that is slightly inconsistent with its dominant line. For instance, an image with a horizontal, vertical, or negligible dominant line may be earmarked for diagonal panning/movement to satisfy a default or user provided specification. Likewise an image with a diagonal dominant line may be earmarked for horizontal or vertical panning/movement in order to satisfy a default or user provided specification. However, in such instances, data points associated with these inconsistently panned images will be near dividing lines, and thus will have more ambiguous dominant lines than images which are further from dividing lines. In many cases, such inconsistently panned images will also have elements of more than one dominant line, such as a horizontal dominant line of medium strength with a slight diagonal component.

In 1630 of FIG. 16, in one embodiment of the present technology, a direction of movement of an image in a presentation is determined. The direction of movement is based upon the evaluation that was previously performed upon the dominant line information.

Thus, in one such embodiment, where dominant line information for each image is evaluated independently, movement determiner assigns a direction of panning/movement to an image that is substantially in the same directional axis as the dominant line of an image. For example, image 500 (FIG. 5) would be assigned to be panned or moved up or down within a viewing region, which would be directions consistent with dominant line 505. Such panning/movement accentuates and complements the content of an image. In another similar embodiment, in accordance with a default setting or user input, movement determiner 1050 assigns some image or images to be panned or moved substantially in a directional axis orthogonal to a determined dominant line. For example, in such an embodiment image 500 would be assigned to be panned/moved left or right within a viewing region, which would be orthogonal directions to dominant line 505. Such panning/movement is intentionally assigned in conflict with the dominant line of an image to invoke feelings of conflict or dissonance in a viewer.

In another embodiment, consistent with 1630 of FIG. 16, images are panned in a direction as determined by the evaluation of dominant line information with respect to user inputs, default settings, or both, as illustrated by the description of FIG. 17. For example, determinations for movement directions of a plurality of images would be consistent with the data points (1730, 1732, 1734, and 1736) and dividing lines 1720 an 1720 shown in FIG. 17. Thus, for example, movement determiner 1050 will determine that image 500, which is associated with data point 1736 should be panned/moved horizontally and image 1500, which is associated with data point 1732 should be panned/moved diagonally. Such automated determination of the panning/movement directions of images introduces variety with respect to the panning/movement directions used in a presentation, while simultaneously attempting to pan images in a direction that is consistent with the dominant line associated with the image.

In one embodiment, for example, movement determiner 1050 outputs movement information regarding an image as a two-dimensional motion vector which can be interpreted by a presentation generator, such as presentation generator 270. In order to prevent repetition, the sign of the movement vector may be randomly changed. Thus, for example, one image that is assigned to be panned horizontally may be panned from left to right, while another image that is assigned to be panned horizontally may be panned from right to left depending on the random sign assignment to the horizontal motion vector.

Additionally, in one embodiment, movement determiner 1050 is configured to automatically assign a zoom vector. The sign of the zoom vector may be arbitrarily changed, in a similar fashion to the arbitrary changing of the sign of the two dimensional motion vector. Moreover, through use of saliency information, a zoom vector may be directed on or about only a salient portion of an image, thus further complementing the content of an image. Assigning such a zoom vector helps eliminate the repetitiveness of simply panning a particular image in two dimensions and adds interest to the presentation of an image without detracting from image content.

In 1640 of FIG. 16, in one embodiment of the present technology, a speed of movement of an image in a presentation is determined. The speed of movement is based upon the evaluation that was previously performed upon the dominant line information. For example, in one embodiment, the speed of movement/panning of an image is directly proportional to the strength of a dominant line. Thus, the stronger a dominant line is, the faster the image will be moved or panned across a viewing region. Similarly, the weaker the dominant line, the slower an image will be panned or moved across a viewing region. Likewise, in an embodiment where movement determiner 1050 further determines image movement based upon user inputs or default settings, image speed is still proportional to strength of a dominant line. Thus, in FIG. 17, movement determiner 1050 determines the speed of movement for an image based on the distance that the image's associated data point is from origin 1705. This is because weak dominant lines result in data points plotted closer to origin 1705 and strong dominant lines result in data points plotted further from to origin 1705. Thus, movement determiner 1050 will determine that image 1400, which is associated with data point 1734, should be moved at a fairly high rate of speed (such as 50 pixels per second), while image 1500, which is associated with data point 1732, should be moved at a slow rate of speed (such as 2 pixels per second). Linking image speed to the strength of a dominant line has the effect of imparting faster movements to image content that can be most complemented by movement related to the direction of the dominant line. Likewise, images which have a weak or negligible dominant line will be moved at a very slow speed which may be almost imperceptible during the time period that the image is displayed within a presentation.

Additionally, in embodiments where a zoom vector has been assigned to an image, movement determiner 1050 may also arbitrarily assign a zoom speed to the zoom vector. Thus, some images may be zoomed prior to display, while other images may be zoomed at an arbitrary speed during display, or else zoomed at different speeds in relation to the saliency of the portion of the image that is being zoomed upon. This adds interest to a displayed image without detracting from content of the image.

Although the subject matter of the present technology has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of evaluating an image for a dominant line, said method comprising:
    receiving warped mesh information regarding saliency of an image, wherein said warped mesh information is derived based upon at least one summing of saliency values in at least one direction defined direction relative to a saliency map;
    determining displacements of components of said warped mesh information relative to corresponding components in un-warped mesh information; and
    utilizing statistical representations of said displacements to evaluate said image for a dominant line.

2. The method as recited in claim 1, wherein said receiving warped mesh information regarding saliency of an image comprises:
    receiving a two-dimensional warped mesh comprised of a set of substantially vertical separators and a set of substantially horizontal separators.

3. The method as recited in claim 2, wherein said receiving warped mesh information regarding saliency of an image further comprises:
    receiving a two-dimensional warped mesh comprised of a first set of diagonal separators located at substantially a forty-five degree angle with respect to a horizontal axis of said image and a second set of diagonal separators oriented substantially orthogonal to said first set of diagonal separators.

4. The method as recited in claim 1, wherein said determining displacements of components of said warped mesh information relative to corresponding components in un-warped mesh information comprises:
    determining a first statistical representation of displacements for a first set of separator components which are oriented parallel to one another; and
    determining a second statistical representation of displacements for a second set of separator components which are oriented parallel to one another and are also oriented substantially orthogonal to said first set of separators.

5. The method as recited in claim 4, wherein said determining displacements of components of said warped mesh information relative to corresponding components in un-warped mesh information further comprises:
    determining a third statistical representation of displacements for a third set of separators components which are oriented parallel to one another and are also oriented at approximately a forty-five degree angle to a horizontal axis of said image; and
    determining a fourth statistical representation of displacement for a fourth set of separator components which are oriented parallel to one another and are also oriented substantially orthogonal to said third set of separators.

6. The method as recited in claim 4, wherein said utilizing statistical representations of said displacements to evaluate said image for a dominant line comprises:
    utilizing a comparison of said first statistical representation and said second statistical representation to evaluate said image for presence of a dominant line.

7. The method as recited in claim 5, wherein said utilizing statistical representations of said displacements to evaluate said image for a dominant line comprises:
    utilizing a comparison of said third statistical representation and said fourth statistical representation to evaluate said image for presence of a dominant line.

8. The method as recited in claim 1, wherein said utilizing statistical representations of said displacements to evaluate said image for a dominant line comprises:
    evaluating a standard deviation of displacements of a first set of said components with respect to a standard deviation of displacements of a second set of said components, wherein a result of said evaluating represents a direction and a strength of said dominant line.

9. A method of determining image movement within a presentation, said method comprising:
    receiving dominant line information related to an image, and wherein said dominant line information is derived based upon at least one summing of saliency values in at least one defined direction relative to a saliency map;

evaluating said dominant line information; and determining a direction of movement of said image in said presentation, wherein said direction of movement is based upon said evaluating of said dominant line information.

10. The method as recited in claim 9, further comprising:

determining a speed of movement of said image in said presentation, wherein said speed of movement is based on said evaluating of said dominant line information.

11. The method as recited in claim 9, wherein said evaluating said dominant line information comprises:

evaluating said dominant line information with respect to user inputs.

12. The method as recited in claim 9, wherein said evaluating said dominant line information comprises:

evaluating said dominant line information with respect to default settings.

13. The method as recited in claim 9, wherein said evaluating said dominant line information comprises:

characterizing a direction of said dominant line based upon said dominant line information.

14. The method as recited in claim 9, wherein said evaluating said dominant line information comprises:

characterizing a strength of said dominant line based upon said dominant line information.

15. The method as recited in claim 9, wherein said determining a direction of movement of said image in a presentation, wherein said direction of movement is based upon said evaluating of said dominant line information comprises:

determining said direction of movement of said image in said presentation, wherein said direction of movement is substantially in the same axis as a dominant line of said image.

16. The method as recited in claim 9, wherein said determining a direction of movement of said image in a presentation, wherein said direction of movement is based upon said evaluating of said dominant line information comprises:

determining said direction of movement for said presentation of said image, wherein said direction of movement is substantially in an axis orthogonal to a dominant line of said image.

17. An image panning system, said system comprised of:

a warped mesh generator configured to receive image saliency data about the saliency of an image and to perform at least one summation of the saliency values in at least one direction relative to a saliency map;

a displacement analyzer for analyzing displacements of components in a received warped mesh representation of an image;

a dominant line determiner configured for locating a dominant line within an image; and a movement determiner configured to couple with said dominant line determiner, said movement determiner configured for determining a direction of movement of said image within a viewing region, wherein said direction of movement is based upon the direction of said dominant line.

18. The image panning system of claim 17, further comprising:

a warped mesh receiver for receiving data defining a warped mesh representation of said image, wherein said warped mesh receiver is configured to couple with said displacement analyzer as an input.

19. The image panning system of claim 17, wherein said dominant line determiner is configured for locating dominant lines which are substantially in a horizontal, vertical, or diagonal axis within an image.

20. The image panning system of claim 17, wherein said movement determiner is further configured for determining a speed of movement of said image within said viewing region, wherein said speed of movement is based upon a strength of said dominant line.

* * * * *